(12) United States Patent
Durham et al.

(10) Patent No.: US 11,768,946 B2
(45) Date of Patent: Sep. 26, 2023

(54) LOW MEMORY OVERHEAD HEAP MANAGEMENT FOR MEMORY TAGGING

(71) Applicant: Intel Corporation, Santa Clara, CA (US)

(72) Inventors: David M. Durham, Beaverton, OR (US); Ramya Jayaram Masti, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 840 days.

(21) Appl. No.: 16/723,871

(22) Filed: Dec. 20, 2019

(65) Prior Publication Data

US 2020/0125502 A1 Apr. 23, 2020

Related U.S. Application Data

(60) Provisional application No. 62/868,884, filed on Jun. 29, 2019.

(51) Int. Cl.
*G06F 12/14* (2006.01)
*G06F 21/60* (2013.01)
(Continued)

(52) U.S. Cl.
CPC ........ *G06F 21/602* (2013.01); *G06F 9/30043* (2013.01); *G06F 9/30101* (2013.01); *G06F 9/30178* (2013.01); *G06F 9/321* (2013.01); *G06F 9/45558* (2013.01); *G06F 9/48* (2013.01); *G06F 9/5016* (2013.01); *G06F 12/0207* (2013.01); *G06F 12/0646* (2013.01); *G06F 12/0811* (2013.01); *G06F 12/0875* (2013.01); *G06F 12/0897* (2013.01); *G06F 12/1408* (2013.01); *G06F 12/1458* (2013.01);
(Continued)

(58) Field of Classification Search
CPC .................. G06F 12/1408; G06F 12/1466
See application file for complete search history.

(56) References Cited

U.S. PATENT DOCUMENTS 6,570,989 B1 5/2003 Ohmori et al.
7,043,016 B2 5/2006 Roelse
(Continued)

FOREIGN PATENT DOCUMENTS

DE 102018125786 A1 5/2019
EP 2073430 A1 6/2009
(Continued)

OTHER PUBLICATIONS

USPTO Notice of Allowance in U.S. Appl. No. 16/722,707 dated Mar. 28, 2022 (10 pages).
(Continued)

*Primary Examiner* — Matthew T Henning
(74) *Attorney, Agent, or Firm* — Alliance IP, LLC

(57) ABSTRACT

A method comprising responsive to a first instruction requesting a memory heap operation, identifying a data block of a memory heap; accessing a tag history for the data block, the tag history comprising a plurality of tags previously assigned to the data block; assigning a tag to the data block, wherein assigning the tag comprises verification that the tag does not match any of the plurality of tags of the tag history; and providing the assigned tag and a reference to a location of the data block.

20 Claims, 11 Drawing Sheets

(51) Int. Cl.

| | | |
|---|---|---|
| *G06F 12/0897* | (2016.01) | |
| *G06F 9/30* | (2018.01) | |
| *G06F 9/48* | (2006.01) | |
| *G06F 21/72* | (2013.01) | |
| *H04L 9/06* | (2006.01) | |
| *G06F 12/06* | (2006.01) | |
| *G06F 12/0875* | (2016.01) | |
| *G06F 21/79* | (2013.01) | |
| *G06F 9/455* | (2018.01) | |
| *G06F 12/0811* | (2016.01) | |
| *G06F 21/12* | (2013.01) | |
| *H04L 9/08* | (2006.01) | |
| *G06F 9/32* | (2018.01) | |
| *G06F 9/50* | (2006.01) | |
| *G06F 12/02* | (2006.01) | |
| *H04L 9/14* | (2006.01) | |
| *G06F 21/62* | (2013.01) | |

(52) U.S. Cl.
CPC .......... *G06F 12/1466* (2013.01); *G06F 21/12* (2013.01); *G06F 21/6227* (2013.01); *G06F 21/72* (2013.01); *G06F 21/79* (2013.01); *H04L 9/0637* (2013.01); *H04L 9/0822* (2013.01); *H04L 9/0861* (2013.01); *H04L 9/0869* (2013.01); *H04L 9/0894* (2013.01); *H04L 9/14* (2013.01); *G06F 2009/45587* (2013.01); *G06F 2212/1052* (2013.01); *H04L 2209/125* (2013.01)

(56) References Cited

U.S. PATENT DOCUMENTS

| | | | |
|---|---|---|---|
| 7,254,718 | B2 | 8/2007 | Kaminaga et al. |
| 7,907,723 | B2 | 3/2011 | Rubin |
| 8,085,934 | B1 | 12/2011 | Bhooma |
| 8,675,868 | B1 | 3/2014 | Yearsley et al. |
| 8,798,263 | B2 | 8/2014 | Pasini et al. |
| 9,213,653 | B2 | 12/2015 | Durham et al. |
| 9,350,534 | B1 | 5/2016 | Poo et al. |
| 9,436,847 | B2 | 9/2016 | Durham et al. |
| 9,514,285 | B2 | 12/2016 | Durham et al. |
| 9,811,661 | B1 | 11/2017 | Golovkin et al. |
| 9,830,162 | B2 | 11/2017 | LeMay |
| 9,990,249 | B2 | 6/2018 | Durham et al. |
| 10,216,522 | B2 | 2/2019 | LeMay |
| 10,387,305 | B2 | 8/2019 | Durham et al. |
| 10,536,266 | B2 | 1/2020 | Courtney |
| 10,585,809 | B2 | 3/2020 | Durham et al. |
| 10,706,164 | B2 | 7/2020 | LeMay et al. |
| 10,769,272 | B2 | 9/2020 | Durham et al. |
| 10,860,709 | B2 | 12/2020 | LeMay et al. |
| 2002/0094081 | A1 | 7/2002 | Medvinsky |
| 2003/0091185 | A1 | 5/2003 | Swindlehurst et al. |
| 2003/0101362 | A1 | 5/2003 | Dia |
| 2003/0126349 | A1 | 7/2003 | Nalawadi et al. |
| 2003/0149869 | A1 | 8/2003 | Gleichauf |
| 2004/0123288 | A1 | 6/2004 | Bennett et al. |
| 2004/0215895 | A1 | 10/2004 | Cypher |
| 2004/0268057 | A1 | 12/2004 | Landin et al. |
| 2007/0152854 | A1 | 7/2007 | Copley |
| 2007/0201691 | A1 | 8/2007 | Kumagaya |
| 2008/0080708 | A1 | 4/2008 | McAlister et al. |
| 2008/0130895 | A1 | 6/2008 | Jueneman et al. |
| 2008/0140968 | A1* | 6/2008 | Doshi ................. G06F 12/1466 711/E12.091 |
| 2008/0263117 | A1 | 10/2008 | Rose et al. |
| 2009/0172393 | A1 | 7/2009 | Tanik et al. |
| 2009/0220071 | A1 | 9/2009 | Gueron et al. |
| 2009/0254774 | A1 | 10/2009 | Chamdani et al. |
| 2010/0023707 | A1 | 1/2010 | Hohmuth et al. |
| 2011/0099429 | A1 | 4/2011 | Varma et al. |
| 2011/0161680 | A1 | 6/2011 | Grube et al. |
| 2011/0296202 | A1 | 12/2011 | Henry et al. |
| 2012/0163453 | A1 | 6/2012 | Horowitz |
| 2012/0284461 | A1 | 11/2012 | Larin et al. |
| 2013/0275766 | A1 | 10/2013 | Plainecassagne et al. |
| 2014/0173293 | A1 | 6/2014 | Kaplan |
| 2014/0270159 | A1 | 9/2014 | Youn et al. |
| 2015/0234728 | A1 | 8/2015 | Coleman et al. |
| 2015/0244518 | A1 | 8/2015 | Koo et al. |
| 2015/0378941 | A1 | 12/2015 | Rozas et al. |
| 2016/0056954 | A1 | 2/2016 | Lee et al. |
| 2016/0092702 | A1 | 3/2016 | Durham et al. |
| 2016/0094552 | A1 | 3/2016 | Durham et al. |
| 2016/0104009 | A1 | 4/2016 | Henry et al. |
| 2016/0154963 | A1 | 6/2016 | Kumar et al. |
| 2016/0188889 | A1 | 6/2016 | Trivedi et al. |
| 2016/0285892 | A1 | 9/2016 | Kishinevsky et al. |
| 2016/0364707 | A1 | 12/2016 | Varma |
| 2017/0026171 | A1 | 1/2017 | Lal et al. |
| 2017/0063532 | A1 | 3/2017 | Bhattacharyya et al. |
| 2017/0177368 | A1* | 6/2017 | DeHon ................ G06F 12/1458 |
| 2017/0285976 | A1 | 10/2017 | Durham et al. |
| 2018/0095812 | A1 | 4/2018 | Deutsch et al. |
| 2018/0095899 | A1 | 4/2018 | Durham et al. |
| 2018/0095906 | A1 | 4/2018 | Doshi et al. |
| 2018/0109508 | A1 | 4/2018 | Wall et al. |
| 2018/0287785 | A1 | 10/2018 | Pfannenschmidt et al. |
| 2018/0365069 | A1 | 12/2018 | Nemiroff et al. |
| 2019/0026236 | A1 | 1/2019 | Barnes |
| 2019/0042369 | A1 | 2/2019 | Deutsch et al. |
| 2019/0042481 | A1 | 2/2019 | Feghali et al. |
| 2019/0042734 | A1 | 2/2019 | Kounavis et al. |
| 2019/0042766 | A1 | 2/2019 | Pappachan et al. |
| 2019/0042796 | A1 | 2/2019 | Bokern et al. |
| 2019/0042799 | A1 | 2/2019 | Durham et al. |
| 2019/0044954 | A1 | 2/2019 | Kounavis et al. |
| 2019/0045016 | A1 | 2/2019 | Dewan et al. |
| 2019/0050558 | A1 | 2/2019 | LeMay et al. |
| 2019/0095350 | A1 | 3/2019 | Durham et al. |
| 2019/0097794 | A1 | 3/2019 | Nix |
| 2019/0102567 | A1 | 4/2019 | LeMay et al. |
| 2019/0102577 | A1 | 4/2019 | Gueron et al. |
| 2019/0227951 | A1 | 7/2019 | Durham et al. |
| 2019/0319781 | A1 | 10/2019 | Chhabra et al. |
| 2019/0347445 | A1 | 11/2019 | Chen |
| 2019/0354726 | A1 | 11/2019 | Critelli et al. |
| 2020/0004953 | A1 | 1/2020 | LeMay et al. |
| 2020/0007332 | A1 | 1/2020 | Girkar et al. |
| 2020/0076585 | A1 | 3/2020 | Sheppard et al. |
| 2020/0117810 | A1 | 4/2020 | Kounavis et al. |
| 2020/0125501 | A1 | 4/2020 | Durham et al. |
| 2020/0125742 | A1 | 4/2020 | Kounavis et al. |
| 2020/0125769 | A1 | 4/2020 | Kounavis et al. |
| 2020/0125770 | A1 | 4/2020 | LeMay et al. |
| 2020/0134234 | A1 | 4/2020 | LeMay et al. |
| 2020/0145187 | A1 | 5/2020 | Kounavis et al. |
| 2020/0145199 | A1 | 5/2020 | Kounavis et al. |
| 2020/0159676 | A1 | 5/2020 | Durham et al. |
| 2020/0169383 | A1 | 5/2020 | Durham et al. |
| 2020/0201789 | A1 | 6/2020 | Durham et al. |
| 2020/0257827 | A1 | 8/2020 | Kounavis et al. |
| 2020/0380140 | A1 | 12/2020 | Medwed et al. |
| 2020/0382289 | A1 | 12/2020 | Xue et al. |
| 2021/0004470 | A1 | 1/2021 | Babic et al. |
| 2021/0058379 | A1 | 2/2021 | Bursell et al. |
| 2021/0117340 | A1 | 4/2021 | Trikalinou et al. |
| 2021/0117342 | A1 | 4/2021 | Durham |
| 2021/0149825 | A1 | 5/2021 | Durham et al. |
| 2021/0150040 | A1 | 5/2021 | Durham et al. |

(56) References Cited

U.S. PATENT DOCUMENTS

| | | |
|---|---|---|
| 2021/0218547 A1 | 7/2021 | Weiler et al. |
| 2022/0019698 A1 | 1/2022 | Durham et al. |

FOREIGN PATENT DOCUMENTS

| | | |
|---|---|---|
| EP | 3326102 A1 | 5/2018 |
| JP | 2009139899 A | 6/2009 |
| WO | 2017014885 A1 | 1/2017 |

OTHER PUBLICATIONS

USPTO Notice of Allowance in U.S. Appl. No. 16/724,105 dated Mar. 31, 2022 (8 pages).
Andreatos et al., "A comparison of random number sequences for image encryption", Mathematical Methods in Science and Engineering, 2014, pp. 146-151 (Year: 2014) (7 pages).
USPTO Final Office Action in U.S. Appl. No. 16/724,059 dated Sep. 2, 2022 (34 pages).
USPTO Non-Final Office Action in U.S. Appl. No. 16/722,342 dated Aug. 29, 2022 (14 pages).
USPTO Notice of Allowance in U.S. Appl. No. 16/709,612 dated Aug. 23, 2022 (18 pages).
USPTO Notice of Allowance in U.S. Appl. No. 16/724,026 dated Aug. 10, 2022 (9 pages).
USPTO Non-Final Office Action in U.S. Appl. No. 16/723,977 dated Aug. 3, 2021 (37 pages).
"Armv8.5—A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.
Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).
Beaulieu, Ray et al., "Simon and Spec: Block Ciphers for the Internet of Things," National Security Agency, Jul. 2015 (15 pages).
Borghoff, Julia et al., "Prince—A Low-Latancy Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).
Carr, Scott A. et al., "DataShield: Configurable Data Confidentiality and Integrity," Purdue University, ASIA CCS, '17, Apr. 2-6, 2017, Abu Dhabi, United Arab Emirates (12 pages).
Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.
EPO; Extended European Search Report issued in EP Patent Application No. 20163534.9, dated Sep. 24, 2020; 8 pages.
EPO; Extended European Search Report issued in EP Patent Application No. 20163546.3, dated Sep. 28, 2020; 8 pages.
EPO; Extended European Search Report issued in EP Patent Application No. 20163670.1, dated Sep. 29, 2020; 8 pages.
EPO; Extended European Search Report issued in EP Patent Application No. 20163907.7, dated Oct. 6, 2020; 9 pages.
EPO; Extended European Search Report issued in EP Patent Application No. 20164326.9, dated Oct. 2, 2020; 9 pages.
EPO; Extended European Search Report issued in EP Patent Application No. 20164636.1, dated Oct. 6, 2020; 8 pages.
EPO; Extended European Search Report issued in EP Patent Application No. 20168972.6, dated Jul. 3, 2020; 9 pages.
EPO; Extended European Search Report issued in EP Patent Application No. 20181907.5, dated Nov. 2, 2020; 9 pages.
EPO; Extended European Search Report issued in EP Patent Application No. 20193625.9, dated Feb. 22, 2021; 7 pages.
EPO; Extended European Search Report issued in European Patent Application No. EP 20163095.1, dated Aug. 10, 2020; 9 pages.
EPO; Extended European Search Report issued in Patent Application No. EP 20163518.2, dated Aug. 19, 2020; 10 pages.
EPO; Extended European Search Report issued in Patent Application No. EP 20163661.0, dated Aug. 17, 2020; 9 pages.
Liljestrand, Hans, et al., "PAC it up: Towards Pointer Integrity using ARM Pointer Authentication", accessed at https://arxiv.org/pdf/1811.09189.pdf, last updated May 24, 2019, 21 pages.
Neagu, Madalin, et al.; "Increasing Memory Security Through Data Scrambling and Information Entropy Models," 2014 IEEE 15th International Symposium on Computational Intelligence and Informatics; Nov. 2014; 5 pages.
Watson, Robert N.M., et al., "An Introduction to CHERI", Technical Report UCAM-CL-TR-941, University of Cambridge Computer Labratory, Cambridge, United Kingdom, Sep. 2019, 43 pages.
Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).
Nasahl, Pascal et al., "CrypTag: Thwarting Physical and Logical Memory Vulnerabilities using Cryptographically Colored Memory", https://doi .org/10.48550/arXiv.2012.06761, ARXIV ID: 2012.06761, Dec. 12, 2020. (13 pages).
Tuck, Nathan et al., "Hardware and Binary Modification Support for Code Pointer Protection From Buffer Overflow," 37th International Symposium on Microarchitecture (MICRO-37'04), 2004, pp. 209-220 (12 pages).
USPTO Notice of Allowance in U.S. Appl. No. 17/134,406 dated Oct. 5, 2022 (10 pages).
Whelihan, David et al., "A Key-Centric Processor Architecture for Secure Computing," 2016 IEEE International Symposium on Hardware Oriented Security and Trust (HOST), 2016, pp. 173-178. (6 pages).
Zhu, Ge et al., "Protection against indirect overflow attacks on pointers," Second IEEE International Information Assurance Workshop, 2004. Proceedings., 2004, pp. 97-106 (10 pages).
USPTO Supplemental Notice of Allowance in U.S. Appl. No. 16/722,707 dated Apr. 8, 2022 (5 pages).
USPTO Non-Final Office Action in U.S. Appl. No. 16/740,359 dated Sep. 27, 2021 (8 pages).
USPTO Notice of Allowance in U.S. Appl. No. 16/723,468 dated Oct. 18, 2021 (11 pages).
USPTO Notice of Allowance in U.S. Appl. No. 16/724,105 dated Nov. 16, 2021 (9 pages).
USPTO Non-Final Office Action in U.S. Appl. No. 17/134,405 dated Aug. 1, 2022 (15 pages).
Bernstein, Daniel J., "Gimli," Sep. 27, 2019, retrieved from https://csrc.nist.gov/CSRC/media/Projects/lightweight-cryptography/documents/round-2/spec-doc-rnd2/gimli-spec-round2.pdf, (48 pages).
BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.
Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).
Dworkin, Morris, "Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).
Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.urnich.edu/~barisk/public/morpheus.pdf, (16 pages).
Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).

(56) References Cited

OTHER PUBLICATIONS

Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).

Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).

Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).

Lilijestrand, Hans et al. "PACStack: an Authenticated Call Stack," Sep. 3, 2019, retrieved from https://arxiv.org/pdf/1905.10242.pdf, (20 pages).

Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).

Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, (15 pages.).

Serebryany, Kostya, "ARM Memory Tagging Extension and How it Improves C/C++ Memory Safety," Summer 2019, (5 pages).

The Electronics Resurgence Initiative, "SSITH: TA1 (Hardware) Performers," Dec. 22, 2018, available online at https://eri-summit.darpa.mil/docs/ERIPoster_Applications_SSITH_DARPA.pdf, (1 page).

USPTO Non-Final Office Action in U.S. Appl. No. 16/723,927 dated Jun. 8, 2021 (32 pages).

USPTO Non-Final Office Action in U.S. Appl. No. 16/724,105 dated Jul. 13, 2021 (10 page).

Watson, Robert N.M., et al., "Cheri: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.

USPTO Notice of Allowance in U.S. Appl. No. 16/776,467 dated Jul. 18, 2022 (9 pages).

Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).

Pyo, Changwoo, "Encoding Function Pointers and Memory Arrangement Checking against Buffer Overflow Attack," In Proceedings of the 4th International Conference on Information and Communications Security (ICICS 2002) (12 pages).

USPTO Final Office Action in U.S. Appl. No. 16/720,059 dated Jan. 21, 2022 (20 pages).

USPTO Non-Final Office Action in U.S. Appl. No. 17/134,406 dated Jan. 21, 2022 (11 pages).

USPTO Notice of Allowance in U.S. Appl. No. 16/723,977 dated Feb. 3, 2022 (13 pages).

Yang, Jun et al., "Improving Memory Encryption Performance in Secure Processors," IEEE Transactions on Computers, vol. 54, No. 5, May 2005 (11 pages).

EPO; Extended European Search Report issued in EP Patent Application No. 21195529.9, dated Mar. 1, 2022; 6 pages.

EPO; Extended European Search Report issued in EP Patent Application No. 21196104.0, dated Feb. 15, 2022; 10 pages.

USPTO Non-Final Office Action in U.S. Appl. No. 16/709,612 dated Feb. 17, 2022 (17 pages).

USPTO Notice of Allowance in U.S. Appl. No. 16/740,359 dated Mar. 22, 2022 (9 pages).

USPTO Notice of Allowance in U.S. Appl. No. 16/723,927 dated Dec. 24, 2021 (13 pages).

USPTO Notice of Allowance in U.S. Appl. No. 16/722,342 dated Feb. 23, 2023 (7 pages).

USPTO Notice of Allowance in U.S. Appl. No. 16/709,612 dated Nov. 25, 2022 (14 pages).

USPTO Notice of Allowance in U.S. Appl. No. 16/724,026 dated Dec. 7, 2022 (15 pages).

USPTO Notice of Allowance in U.S. Appl. No. 16/776,467 dated Nov. 9, 2022 (8 pages).

EPO Communication Pursuant to Article 94(3) EPC in EP Application Serial No. 20181907.5-1218 dated Mar. 27, 2023 (6 pages).

USPTO Notice of Allowance in U.S. Appl. No. 17/134,405 dated Dec. 26, 2020 (8 pages).

USPTO Restriction Requirement in U.S. Appl. No. 16/862,022 dated Feb. 2, 2023 (6 pages).

USPTO Non-Final Office Action in U.S. Appl. No. 17/576,533 dated Feb. 7, 2023 (8 pages).

USPTO Notice of Allowance in U.S. Appl. No. 17/134,405 dated Jan. 31, 2023 (8 pages).

USPTO Non-Final Office Action in U.S. Appl. No. 17/833,515 dated Apr. 14 (24 pages).

\* cited by examiner

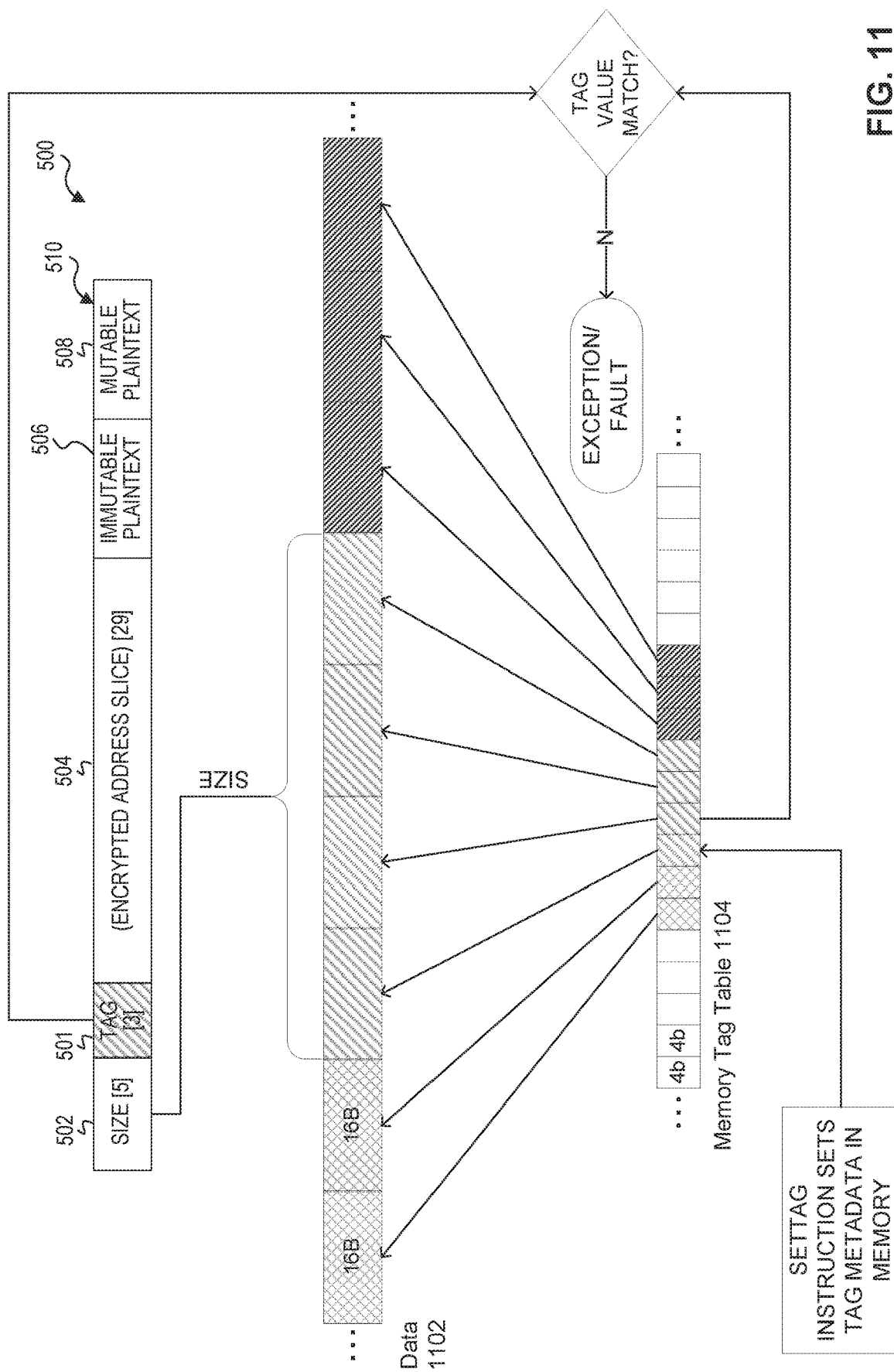

LOW MEMORY OVERHEAD HEAP MANAGEMENT FOR MEMORY TAGGING

CROSS-REFERENCE TO RELATED APPLICATIONS

This application claims the benefit of and priority from U.S. Provisional Patent Application No. 62/868,884 entitled "Cryptographic Computing" and filed Jun. 29, 2019, the entire disclosure of which is incorporated herein by reference.

TECHNICAL FIELD

This disclosure relates in general to the field of computing systems and, more particularly, to low memory overhead heap management for memory tagging.

BACKGROUND

Protecting memory in computer systems from software bugs and security vulnerabilities is a significant concern. In a computing system, a heap manager may service requests from various applications for memory allocation at runtime. Unless the heap manager takes precautions, contents in a portion of memory that was previously allocated to a first application may be accessed by another application.

BRIEF DESCRIPTION OF THE DRAWINGS

FIG. 11 depicts a flow for associating encrypted tags with corresponding subportions of an allocated data block in accordance with certain embodiments.

Like reference numbers and designations in the various drawings indicate like elements.

DESCRIPTION OF EXAMPLE EMBODIMENTS

Figure 1:
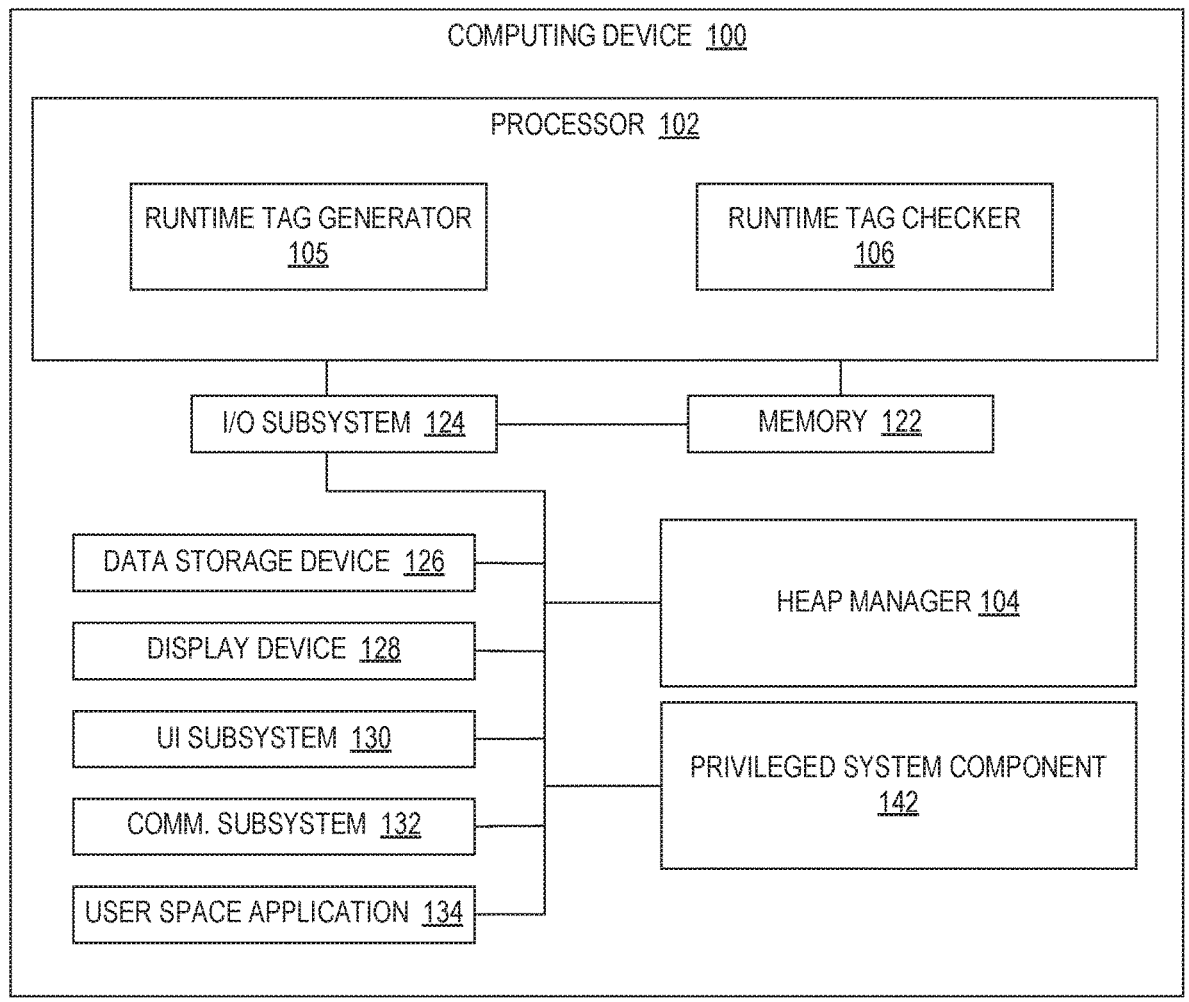
FIG. 1 illustrates a computing device in accordance with certain embodiments.

Memory tagging is a memory safety technology that reduces the risk of runtime memory safety violations by maintaining reference metadata including tags for memory locations and comparing a tag in an incoming memory access request against the assigned tag for the data block including the memory location that is the subject of the memory access request. If the incoming tag does not match the assigned tag, the memory access request is not performed. Memory tagging solutions are mainly aimed at achieving heap protection, e.g., to prevent corruption or illegal access to dynamically allocated memory in software programs. A heap manager may be responsible for administering the heap space during memory allocations and deallocations. The heap manager may generate a tag for a data block during memory allocation and change the tag to a different value when the memory is released or reallocated. The heap manager may prevent tag reuse, e.g., assignment of the same tag to a particular data block across subsequent allocations of that data block.

Various heap management solutions (e.g., the heap allocator for Linux) for memory tagging rely on quarantining deallocated memory to prevent tag reuse. When a data block is deallocated, that data block is made unavailable for reuse for a certain duration of time following the deallocation. Such heap management approaches may protect against the use of a pointer to a portion of a data block after the data block has been deallocated and put back into use, but result in quarantined memory that remains unusable for extended periods of time, leading to lower overall memory utilization.

Various embodiments of the present disclosure provide a secure heap management solution that prevents tag reuse without incurring a large memory overhead. For example, a heap manager may maintain a history of previous tags as part of the heap management metadata and take the history into account during a memory heap operation (e.g., memory allocation and/or release operation). This allows reuse of a data block immediately after it is released provided that it is possible to assign a tag value that differs from the previous tag values as indicated by the tag history. Tags may also be assigned to data blocks in a manner so as to prevent immediately adjacent data blocks in the heap from having the same tag (e.g., in order to prevent an illegal memory access occurring as a result of a memory overflow). In various examples, tags may be assigned in a random fashion or in a deterministic fashion that is optimized to reduce tag duplication. Various embodiments may significantly reduce the need for quarantining heap blocks and thus reduce the memory overhead of heap management for memory tagging solutions.

In some embodiments, size information may be encoded into the pointer of an allocated data block, describing the bounds of an object allocation as an alternative to or in addition to a tag. Various aspects of the present disclosure may provide a cryptographic form of memory tagging in which a data block allocated from memory is cryptographically bound with the tagged or sized pointer encoding.

Referring in detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein.

As shown in FIG. 1, the example computing device 100 includes at least one processor 102. Processor 102 includes runtime tag generator 105 and runtime tag checker 106, among other components (not shown in FIG. 1) such as circuitry to implement components (e.g., software or other components), such as heap manager 104. Heap manager 104 may be operable to receive requests for memory heap operations, such as memory allocation requests and memory deallocation requests. The heap manager 104 may service such requests. When responding to an allocation request, the heap manager 104 may return a reference to a location of the requested data block and a tag assigned to the data block to the application requesting the memory heap operation (where the tag is generated by runtime tag generator 105). When an application attempts to access the allocated memory, it may provide the location of the data block as well as the tag to the runtime tag checker 106. The runtime tag checker 106 may verify that the provided tag matches the tag assigned to the data block and may allow service of the memory request if the tags match and block the access if the tags do not match.

The computing device 100 also includes memory 122, an input/output subsystem 124, a data storage device 126, a display device 128, a user interface (UI) subsystem 130, a communication subsystem 132, at least one user space application 134, and privileged system component 142. The computing device 100 may include other or additional components, such as those commonly found in mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor, a processing/controlling circuit, or multiple diverse processing units or circuits (e.g., a CPU and a Graphic Processing Unit (GPU), etc.).

The memory 122 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 122 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, memory 122 comprises one or more memory modules, such as dual in-line memory modules (DIMMs). In some embodiments, the memory 122 may be located on one or more integrated circuit chips that are distinct from an integrated circuit chip comprising processor 102 or may be located on the same integrated circuit chip as the processor 102. Memory 122 may comprise any suitable type of memory and is not limited to a particular speed or technology of memory in various embodiments.

In operation, the memory 122 may store various data and software used during operation of the computing device 100, as well as software applications utilized by computing device 100, such as operating systems, user applications, programs, libraries, and drivers. Memory 122 may store data and/or sequences of instructions that are executed by the processor 102. In various embodiments, the heap may be stored in memory 122 or other suitable memory of computing device 100.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with one or more of the processor 102, the memory 122, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 122 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. In some embodiments, the communication subsystem 132 may be embodied as a network adapter, such as a wireless network adapter.

The example computing device 100 also includes a number of computer program components, such as one or more user space applications 134 or other applications. The user space application 134 may be embodied as any computer application (e.g., software, firmware, hardware, or a combination thereof) that interacts directly or indirectly with an end user via, for example, the display device 128 or the UI subsystem 130. Some examples of user space applications 134 include word processing programs, document viewers/readers, web browsers, electronic mail programs, messaging services, computer games, camera and video applications, etc. Among other things, the privileged system component 142 facilitates the communication between the user space applications 134 and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

Figure 2:
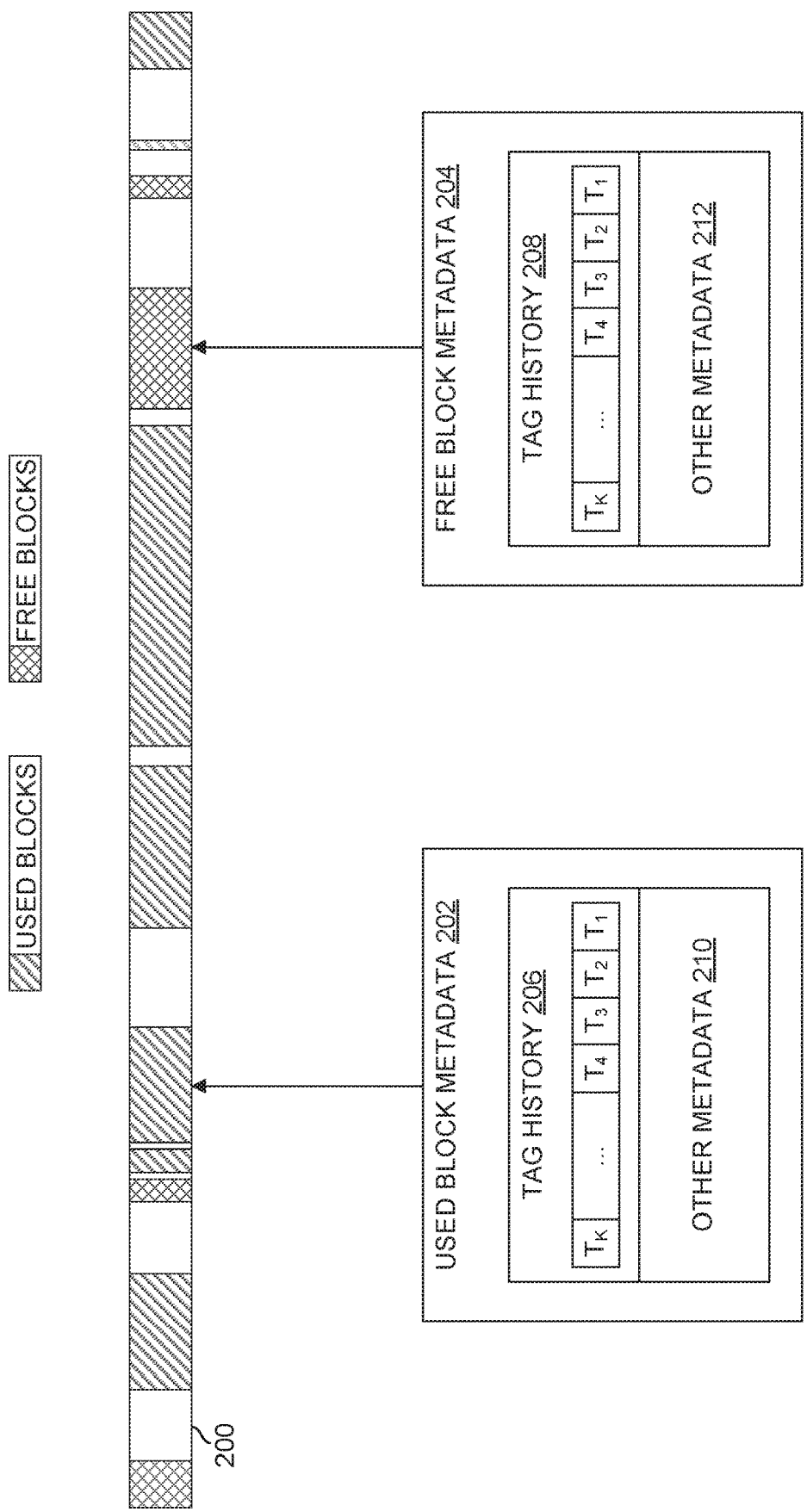
FIG. 2 illustrates a memory heap in accordance with certain embodiments.

FIG. 2 illustrates a memory heap 200 in accordance with certain embodiments. The memory heap 200 may be stored in any suitable memory, such as memory 122. The memory heap 200 includes a plurality of blocks, some of which are used (e.g., allocated to applications) or free (e.g., available to be allocated to a requesting application). The memory heap 200 may also include other allocable portions of memory, such as quarantined blocks that later become available or other memory not assigned to a block. Memory heap 200 is depicted as an interspersed set of used and free blocks of varying size.

Memory heap 200 may be used to allocate dynamic objects for applications at runtime (e.g., objects that are not stored in a stack of an application). A portion of the memory heap 200 may be made available to each application requesting memory allocation. The heap manager 104 may receive requests from applications and service the requests. For example, a request may include a request to allocate a data block of a particular size, a request to resize an allocated data block (which may include an adjusted size), or a request to release an allocated data block. For example, in the C programming language, such requests may include instructions associated with the malloc( ), calloc( ), dealloc( ), realloc( ), and free( ) function calls, although this disclosure contemplates any suitable memory allocation requests. In response to a memory allocation request from an application, the heap manager 104 may return information associated with an allocated block. For example, the heap manager 104 may return one or more of a pointer to the block, a tag assigned to the block, a size of the block, and a cryptographic key or tweak associated with the block. In some embodiments, the tag, size, or key or tweak may be embedded within the returned pointer. An example format of a such a pointer will be discussed in further detail below in connection with FIG. 5.

The blocks of the heap may be associated with metadata. Metadata for a block may be stored contiguous to the block in the memory heap, at some other location in the memory heap, or other suitable location in memory within processor 102 or coupled to processor 102. For example, in some embodiments, the various collections of metadata may be stored together in a table or each collection may be stored along with the block with which it is associated. In the embodiment depicted, a collection of metadata 202 associated with a used block and a collection of metadata 204 associated with a free block is shown. Metadata 202 includes tag history 206 and other metadata 210, while metadata 204 includes tag history 208 and other metadata 212. Metadata 204 may be similar to metadata 202, but is specific to the associated free block rather than the used block associated with metadata 202.

Other metadata 210 and other metadata 212 may include any suitable data associated with the respective blocks. For example, other metadata 210 or 212 may include data indicating the size of the associated block, a data type of an object to be stored in the associated block, or a cryptographic key or tweak associated with the block (to be explained in more detail below). For example, the data type may include a class of data or code defined by a programming language. For example, the data type could include a type ID of "0" for an integer, a type ID of "1" for a floating point value, a type ID of "2" for a particular complex struct type, and so on. In some embodiments, the cryptographic key or tweak associated with the block may include or otherwise be based on other portions of the metadata.

Tag history 206 includes a plurality of previous tags ($T_1$ through $T_K$, where K is any suitable integer) assigned to the data block associated with metadata 202. For example, $T_K$ may be the currently assigned tag, $T_{K-1}$ may be the tag assigned immediately prior to $T_K$, $T_{K-2}$ may be the tag assigned immediately prior to $T_{K-1}$, and so on. In other embodiments, the current tag may be stored separately from the tag history 206 and thus tags $T_1$ through $T_K$ may be tags previously assigned to the block. A tag may include any suitable identifier, such as a sequence of bits. The first tag may be assigned to the block when the block is allocated for the first time. Each time the block is reallocated (e.g., either at the time of deallocation or at the time it is assigned to the same or a new application), it may be assigned a different tag so as to protect against unauthorized access. Alternatively, if blocks are encrypted using information from the tag in conjunction with a cryptographic key (e.g., as a cryptographic tweak), the same tag could be reused for a block as long as it is used with a different key every time. In various embodiments, if there is a limit to the number of tags that may be stored in a tag history, when the tag history 206 is full, the least recent tag may be deleted to make room for the most recent tag. In another embodiment, there is no limit to the size of the tag history. In various embodiments, a triggering event (e.g., a reset of device 100, a change in size of the block, a change in a cryptographic key associated with the block, etc.) may reset the tag history.

In various embodiments, the size of the tags and the size of the tag histories may be any suitable sizes. As just one example, a tag may be one byte (e.g., 8 bits of data) and a tag history may include 8 tags. In a particular embodiment, the size of the tags is uniform across all blocks and the size of the tag histories is uniform across all blocks, although in other embodiments, the sizes may vary among the blocks of the heap.

When a block is initialized for the first time (e.g., after power up of the system or after some other even that results in a reset of the tag histories), all of the tags in the tag history 206 may be initialized to a reserved value that is not used as a tag (e.g., all zeros, all ones, or other suitable value).

When a memory allocation request is received by the heap manager 104 (e.g., malloc( ) is called), the heap manager 104 may search for a correctly sized heap block (e.g., matching or greater than a size included in the request) from among the free heap blocks. If such a block is not found, a new block may be generated to fulfill the request. The new block may be generated in any suitable manner. For example, the new block may be formed by defragmenting a plurality of smaller blocks or by fragmenting a larger block (generation of a tag history for the new block will be described in further detail below in connection with FIGS. 3A, 3B, and 4).

The block that is identified or generated to fulfill the request may be assigned a tag that is not a part of the tag history of the block. In various embodiments, the tag may be assigned in response to the memory allocation request (e.g., when a new block is created due to fragmentation or defragmentation, when a block is allocated for the first time, or when a block is reallocated) or the tag may have been previously assigned (e.g., responsive to the identified block being previously deallocated as opposed to assigning the tag during reallocation). In various embodiments, the assigned tag is also different from the current tags of any blocks that are physically adjacent to the block in the heap (e.g., the block with the next lowest physical address and the block with the next highest physical address). If a new tag meeting the constraints (e.g., cannot be in the tag history, cannot match the tags of the adjacent blocks, and/or other specified constraint) cannot be found, the block may be quarantined, an additional block is identified or generated (e.g., using the methods described above), and a determination is made as to whether a tag that meets the constraints can be assigned to the additional block. These operations may be repeated until a viable block is found.

In various embodiments, if a tag meeting the constraints is not available for a particular block, that block may be placed into quarantine for a period of time. While the block is quarantined, it is considered to not be available for allocation. The block may be removed from quarantine for any suitable reason. In various embodiments, the block may be removed from quarantine if any condition of a plurality of conditions is met. For example, the block may be removed from quarantine if a particular amount of time has passed. As another example, the block may be removed from quarantine if the tag of an adjacent block has changed, allowing the former tag to be used for the quarantined block. As another example, the block may be removed from quarantine when a cryptographic key or tweak being used in association with cryptography operations for the block has been changed. In some embodiments, when all tag and size values have been exhausted for a physical page (or pages), the heap manager 104 may unmap the linear address for the physical page and alias the same physical page to a new linear address mapping and then proceed with allocations from the new memory page (or pages), thus providing non-repeating tag values allocated for the new linear address.

When a memory deallocation request is received by the heap manager 104 (e.g., free( ) is called), the heap manager 104 may assign a new tag to the block that is not part of the block's tag history (and meets other potential constraints). This may protect the deallocated block from unauthorized accesses that reference the previously assigned tag. If a new tag meeting the constraints (e.g., cannot be in the tag history, cannot match the tags of the adjacent blocks, and/or other specified constraint) cannot be found, the block may be quarantined as described above.

When a memory resizing request is received by the heap manager 104 (e.g., realloc( ) is called), the heap manager may search for a correctly sized heap block (e.g., matching or greater than a size included in the request) from among the free heap blocks. If such a block is not found, a new block may be generated to fulfill the request. The new block may be generated in any suitable manner. For example, the new block may be formed by defragmenting a plurality of smaller blocks or by fragmenting a larger block. The block that is identified or generated to fulfill the request may be assigned (or may already have been assigned, e.g., when last deallocated) a tag that meets all constraints set (e.g., the tag is not a part of the tag history of the block, the tag does not match the tags of the adjacent blocks, and/or other specified constraint). If a tag meeting the constraints cannot be found, the block may be quarantined, an additional block is identified or generated (e.g., using the methods described above), and a determination is made as to whether a tag that meets the constraints can be assigned to the additional block. These operations may be repeated until a viable block is found for the resizing operation.

Figure 3A:
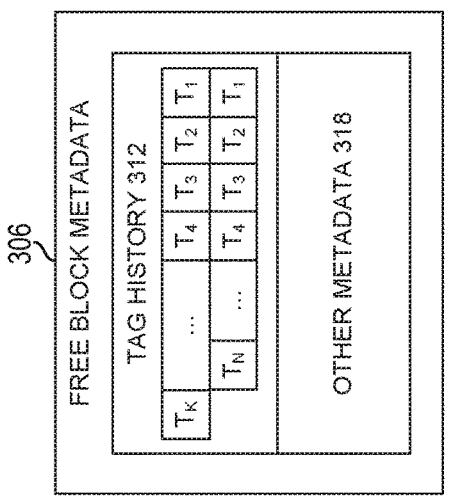
FIGS. 3A and 3B illustrates flows for memory defragmentation in accordance with certain embodiments.
Figure 3B:
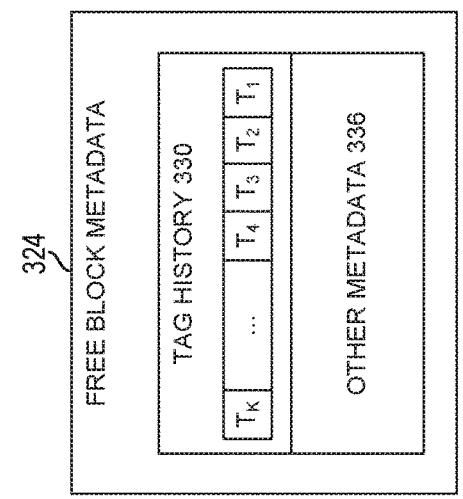

FIGS. 3A and 3B illustrates flows for memory defragmentation in accordance with certain embodiments. The dynamic allocation and deallocation of blocks may result in fragmented blocks within the runtime heap 200. Moreover, the heap 200 may contain blocks of many different sizes. Accordingly, it may be necessary to defragment multiple blocks (which may or may not have different sizes) by combining them together. For example, an incoming memory request may request a large data block when only small data blocks are available. Accordingly, the heap manager 104 may combine multiple small data blocks into a single larger block.

When multiple blocks are combined into a single block, a collection of metadata for the new block is generated. For example, when a block associated with metadata 302 is combined with a block associated with metadata 304, a new collection of metadata 306 is formed and associated with the combined block. Similarly, when a block associated with metadata 320 is combined with a block associated with metadata 322, a new collection of metadata 324 is formed and associated with the combined block.

The new collection of metadata may include a combination of the tag histories of the respective blocks used to form the new block. For example, tag history 312 includes a combination of tag histories 308 and 310, while tag history 330 includes a combination of tag histories 326 and 328. The tag histories may be combined in any suitable manner. For example, in FIG. 3A, the combined tag history 312 includes each tag from the tag histories 308 and 310. Thus, in the embodiment depicted, the new tag history 312 includes a total of K+N tags (where N is the number of tags in tag history 310), and all of the tag histories are retained. Similarly, if more than two blocks are combined to form a new block, the tags of the tag histories from each of the blocks may be retained in the tag history for the new block. In one embodiment, if the same tag value exists in multiple tag histories being combined, a single instance of that tag value is included in the combined tag history.

In the embodiment of FIG. 3B, the tag histories 326 and 328 are combined by merging the tag histories and deleting some of the tags (e.g., due to a limit on the size of a tag history for each block). Thus, although tag history 326 and tag history 328 each include K tags, the combined tag history 330 only includes K tags (assuming the tag history is limited to a size of K). When tags must be omitted in a merger due to a size limit, the determination of which tags are kept may be made in any suitable manner. In one embodiment, the tags may be interlaced, such that the most recent tag from tag history 326 is placed into tag history 330, the most recent tag from tag history 328 is placed into tag history 330, the next most recent tag from tag history 326 is placed into tag history 330, the next most recent tag from tag history 328 is placed into tag history 330, and so on. In another embodiment, the relative frequency with which certain tags are used may be taken into account and the tags that are used more frequently are selected for inclusion in the combined tag history 330. In another embodiment, the tags from a tag history 326 associated with a particular block may be preferred over the tags from the tag histories of the other blocks (e.g., the block that will form the block having the lowest address among the combined blocks may have its tags retained or more of its tags retained relative to other blocks, as such a block may be most susceptible to being illegitimately addressed in some situations). In one embodiment, if the same tag value exists in multiple tag histories being combined, a single instance of that tag value is selected for inclusion in the combined tag history.

When multiple blocks are combined, a new collection of other metadata is also generated. For example, other metadata 318 and other metadata 336 may be generated when their associated blocks are formed of multiple other blocks (and metadata 318 and 336 may be different, at least in part, from other metadata 314, 316, 332, and 334 respectively). For example, the new other metadata may include metadata specific to the combined block, such as a new tag for the block (although in some embodiments the current tag is stored in the tag history rather than separately), a size of the combined block, a type of data to be stored in the combined block, a cryptographic key or tweak for the combined block, or other suitable metadata.

Figure 4:
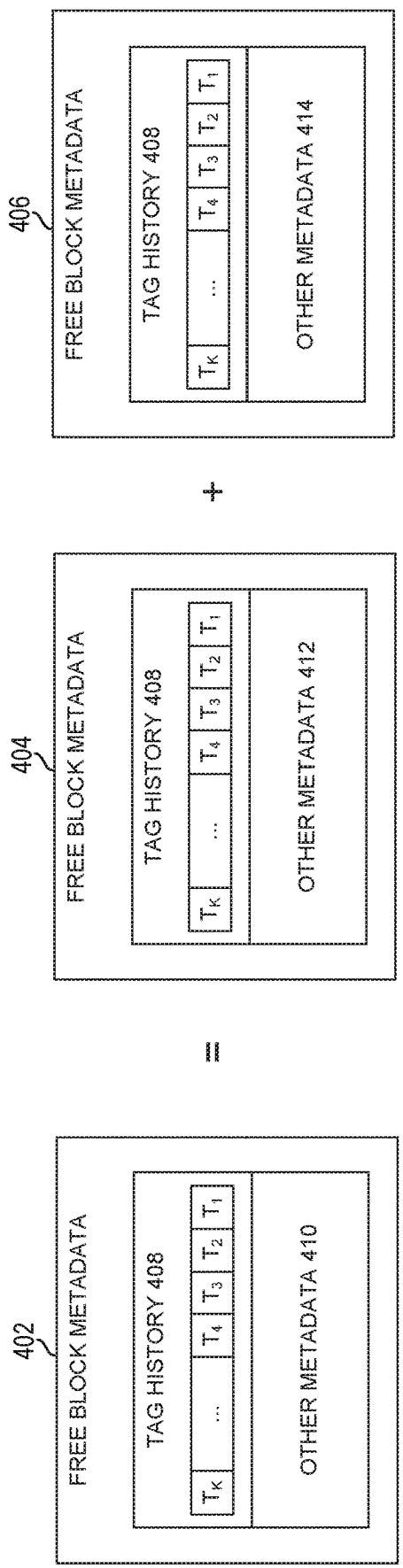
FIG. 4 illustrates a flow for memory fragmentation in accordance with certain embodiments.

FIG. 4 illustrates a flow for memory fragmentation in accordance with certain embodiments. Occasionally, a given free block may be split into two parts during certain heap management operations. For example, a larger block may be split into two smaller blocks in order to satisfy small memory allocation requests when only large free blocks are available. As another example, a resizing operation that specifies a smaller block size than the size of the subject block may result in a block split.

During such a split, the metadata collections for the newly formed blocks each store a copy of the tag history from the parent block. For example, in the embodiment depicted, a block associated with metadata 402 is split to form a block associated with metadata 404 and a block associated with metadata 406. Accordingly, the tag history 408 is replicated within metadata 404 as well as metadata 406.

When a block is split, a new collection of other metadata is also generated for each of the resulting blocks. For example, other metadata 412 and other metadata 414 may be generated when their associated blocks are formed from the split (and these may be different, at least in part, from other metadata 410). A new collection of other metadata may include metadata specific to its respective block, such as a new tag for the block (e.g., in embodiments in which the current tag is stored separately rather than in the tag history), a size of the new block, a type of data to be stored in the new block, a cryptographic key or tweak for the new block, or other suitable metadata.

While a large tag history is more secure because it guards against access through long-lasting dangling pointers, a large tag history can potentially create challenges in finding a new tag for a block, especially after defragmentation (where the tag histories from each block are combined together into the tag history for the new block). In some embodiments in which tag history lengths are not capped (or are different for different blocks), in order to mitigate this issue, the heap manager 104 may limit the number of blocks that can be combined into a new block during a defragmentation operation.

In various embodiments, a maximum size of the tag history for each block (e.g., when all blocks have the same maximum tag history size) may be configurable by a user of device 100 or dynamically modified during runtime based on observed allocation behavior by heap manager 104. For example, if a key used by the processor is changing frequently (where each time the key changes, the tag histories may be reinitialized), the maximum size of the tag history may be kept relatively short, while if the key rarely changes, the maximum size of the tag history may be larger in order to reduce quarantining.

In various embodiments, rather than being a random string of bits, a tag for a block may include other metadata associated with the block or information based thereon (or may have a portion dedicated to such metadata and another portion that is random). For example, a tag may include an ID of a data type associated with the block (e.g., the data type described above or other suitable data type) or a portion of the ID of the data type. Such an embodiment may reduce quarantining as it allows reuse of the same data block for allocations involving different data types. In some embodiments, the ID of the data type may be specified in the memory allocation request, allowing the heap manager 104 to include the ID of the data type (or a portion thereof) in the tag.

As another example, a tag may include a size of the block (or other information indicative of a size of the block). Such an embodiment may also reduce quarantining as it allows reuse of a given data block for allocations (even of the same data type in some instances) as long as the allocations are of different sizes. In some embodiments, heap manager 104 may respond to a memory allocation request for a block of a particular size by allocating the same block, but varying the size of the block, such that the tag for that block is different than when the block was previously allocated. In some embodiments, the heap manager may vary the size of a block responsive to a determination that maintaining the same block size would result in quarantining of the block (e.g., because no allowable tag values are available). Varying the size of the block may be accomplished in any suitable manner. For example, the data block may be fragmented and one of the resulting data blocks is allocated. As another example, the data block may be combined with an adjacent data block and the combined data block may be allocated. In some embodiments, the size of the data block may be varied by allocating the same data block for various allocation size requests. For example, a given block may be used for an allocation that requests a size that is equal to or smaller than the size of the block. For example, a 32-byte block may be used for 4, 8, 16, or 32-byte data block size. As long as the size information is encoded within the tag, the tag assigned for the data block is unique among allocations of various sizes.

Figure 5:
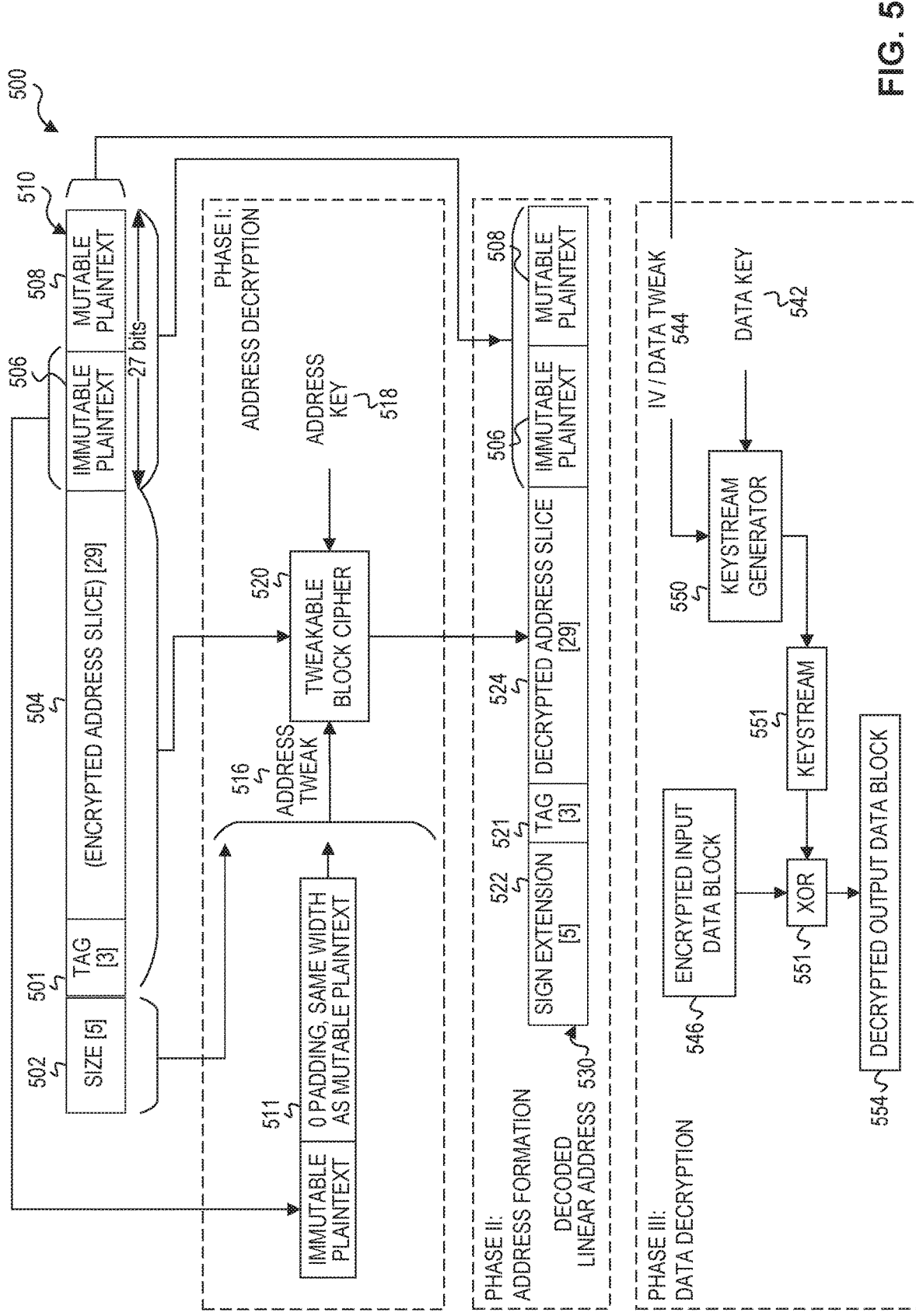
FIG. 5 illustrates a flow for utilizing a cryptographic memory pointer format in accordance with certain embodiments.

FIG. 5 depicts a flow 500 for utilizing an example cryptographically encoded pointer 510 including an embedded size 502 and embedded tag 501 according to certain embodiments of the present disclosure. In various embodiments, the embedded size bits 502 may be considered in combination with one or more other bits (e.g., embedded tag 501 or other bits) of the cryptographically encoded pointer 510 (or other data described herein) as a tag (as described above in connection with the tag histories) or may be used in conjunction with such a tag for the data block associated with the pointer as an added measure of security.

FIG. 5 shows a cryptographically encoded 64-bit pointer (address) in its base format, using exponent (power) size metadata. Such a pointer may be returned by the heap manager 104 to a calling application in response to allocation of a block in the heap fitting in the nearest power-of-two allocation size. In the example shown, the encoded pointer includes a size metadata portion 502 (e.g., 5 bits in the example shown) indicating a size of a mutable plaintext portion 508 (e.g. 6 bits in the example shown) of the pointer 510 (e.g., a number of low order address bits that comprise the mutable plaintext portion 508 of the pointer 510, these bits may be manipulated freely by an application for pointer arithmetic when the application accesses memory within the block, and thus the number of bits in the mutable plaintext portion 508 is indicative of the size of the allocated block addressed by the pointer to the nearest power-of-two). In some embodiments, the size portion 502 may include power (exponent) size metadata bits that indicate a size based on a power of 2. Other embodiments may provide more granular size metadata or metadata offsets to better fit the data allocation size.

As shown in FIG. 5, the size metadata portion 502 may indicate the number of bits that compose the immutable plaintext portion 506 and the mutable plaintext portion 508. In certain embodiments, the total number of bits that make up the immutable plaintext portion 506 and the mutable plaintext portion 508 may be constant, with the sizes of the respective portions being dictated by the size metadata portion 502. For example, if the power metadata value is 0, there are no mutable plaintext bits and all 27 remaining address bits (i.e., immutable plaintext portion 506) are used as a tweak to generate ciphertext portion 504 from an address slice (i.e., a subset of the linear address bits), where the ciphertext portion 504 is adjacent to and more significant than the immutable plaintext portion 506. In addition, the embedded tag 501 may be encrypted by the same block cipher as the ciphertext portion of the address with the immutable plaintext portion of the address 506 used as a tweak, encrypting the combination of the embedded tag 501 and address 504. As a further example, if the power metadata value is 1, then there is one bit of mutable plaintext, if the power metadata value is 2, then there are 2 bits of mutable plaintext, up to 27 bits of mutable plaintext resulting in no immutable plaintext bits (506). The mutable plaintext portion 508 may be manipulated by software, e.g. for pointer arithmetic or other operations. Meanwhile, some embodiments may reserve special values of the size field 502 to indicate legacy canonical linear addresses (e.g., a size value where all bits are set to zero or all bits are set to one indicates a non-encoded or normal linear address that may be used to access memory as plaintext). The ciphertext portion 504 (e.g., 32 bits in the example shown) of the pointer 510 may be encrypted with a small tweakable block cipher (e.g., a k-cipher, SIMON, PRINCE, or SPECK cipher at a 32-bit block size, or other variable bit size block cipher). The remaining address bits compose immutable plaintext portion 506 (e.g. 21 bits in the example shown) and are used as part of the tweak for the tweakable block cipher used to encrypt the ciphertext portion 504. While these bits are also a plaintext (non-encrypted) portion of the address, they cannot be modified by an application (e.g., using pointer arithmetic) like the bits of mutable plaintext portion 508 without causing the ciphertext portion 504 and 501 to decrypt incorrectly, thereby corrupting both the resulting address 524 and tag 521 value (likely resulting in a page fault and/or tag mismatch). The base pointer format shown in FIG. 5 allows for cryptographically describing object sizes and their location in memory. In some cases, the exponent/power/size metadata portion 502 could be provided as a separate parameter in addition to the pointer; however, in some cases (e.g., as shown) the bits of the size metadata portion 502 may be integrated with the pointer 510 to provide legacy compatibility.

In alternative embodiments, the size metadata portion 502 may indicate the number of bits that compose the immutable plaintext portion 506, and thus dictate the number of bits remaining to make up the mutable plaintext portion 508. For example, if the power metadata value is 1, there are no immutable plaintext bits (506) and all 27 remaining address bits (i.e., mutable plaintext portion 508) may be manipulated by software. As a further example, if the power metadata value is 2, then there is one bit of immutable plaintext 506, if the power metadata value is 3, then there are 2 bits of immutable plaintext 506, up to 27 bits of immutable plaintext resulting in no mutable plaintext bits (508), and thus, no bits that can be manipulated by software.

Also, although pointer 510 is illustrated and described based on using 32 bits for the ciphertext portion 504, the pointer format is not intended to be so limited. The address slice to be encrypted may be selected based on readily available 32-bit block encryption ciphers. However, an encryption cipher using any other block size (e.g., 27, 16, variable, etc.), may be used instead. If the number of ciphertext bits is adjusted (upward or downward), the remaining address bits to be encoded (e.g., immutable and mutable portions) may be adjusted accordingly. For example, if the ciphertext portion is adjusted to be 16 bits, then the combined immutable and mutable plaintext portions (506 and 508) could be encoded in 43 bits. In this scenario, however, an additional bit may be added to the size metadata portion 502, with the combined immutable and mutable portions being reduced to 42 bits, so that the size metadata portion 502 can indicate any possible number of bits (e.g., 0-42 bits) to compose the immutable plaintext portion 506 and the mutable plaintext portion 508.

When a processor is running in a cryptographic mode and accessing memory using an encoded pointer (address) (e.g., a pointer formatted in the same or similar manner to pointer 510 of FIG. 5) to get the actual linear/virtual address memory location, the processor takes the encoded address format and decrypts the ciphertext portion (e.g., 504 of FIG. 5) using the variable number of immutable plaintext bits (e.g., 506 in FIG. 5) determined by the size/power/exponent metadata bits (e.g., 502 of FIG. 5) and a secret key. In some instances, the size/power/exponent metadata and/or other metadata or context information may be included as part of the tweak for decrypting the ciphertext portion 504. If the address decrypts incorrectly, the processor may cause a general protection fault (#GP) or page fault due to the attempted memory access with corrupted linear/virtual address or otherwise incorrect tag value.

In various embodiments, data from the pointer 510 (e.g., data including or dependent on the size) may be used (e.g., as a key or a tweak) to encrypt the data in the block referenced by the pointer (thus the pointer can reference the data as well as describe how the data is encrypted). Accordingly, if the size in the pointer 510 is changed, the data of the block will be encrypted differently and the pointer previously used to reference the block (in the previous allocation of the block) is not usable to decrypt data of the block.

The operations of flow 500 are depicted in three phases: address decryption (Phase I), address formation (Phase II), and data decryption (Phase III). In Phase I, the linear address embedded in pointer 510 is decrypted. Specifically, ciphertext portion 504 of the encoded linear address and embedded tag 501 is decrypted by a decryption algorithm such as a tweakable block cipher 520 using an address key 518 and an address tweak 516. In the embodiment depicted, the address tweak 516 includes bits of the size metadata portion 502, and immutable plaintext portion 506, in addition to zeros padding 511. The size metadata portion 502 is used to determine the number of bits in immutable plaintext portion 506 and the number of bits in mutable plaintext portion 508, which equals the number of bits for padding 511 in the address tweak 516. In at least some embodiments, an additional one or more items of variable length metadata may also be used as part of address tweak 516 for the tweakable block cipher 520. For example, the variable length metadata may include other context information or metadata (e.g., permissions, privilege level, type, location, ownership, etc.). The block cipher 520 may be any suitable decryption algorithm (e.g., tweakable version of a 32 bit block size cipher such as SIMON, SPECK, K-CIPHER, or for larger addresses, PRINCE, XTS-AES block cipher, LRW, AES-CTR mode, etc. may be used).

When the ciphertext 504 portion of the encoded linear address and embedded tag 501 has been decrypted into a decrypted address slice 524 and tag 521 by tweakable block cipher 520, then a decoded linear address 530 can be formed in Phase II. In at least one embodiment, the uppermost bits (e.g., size portion 502) can be set to the same bit value (e.g., 0 or 1) to represent a canonical linear address. In addition, the bits of the immutable plaintext portion 506 and mutable plaintext portion 508 make up the lower bits of the decoded linear address 530. In some embodiments, the processor may check whether a slice of the upper bits in decrypted address slice 524 has an expected canonical value as an indication of whether the decrypted address slice 524 was decrypted incorrectly. For example, in some paging modes, some number of upper address bits are required to all have the same value (i.e. all 0's or all 1's). If the corresponding bits in the decrypted address slice 524 have differing values, then that indicates that decrypted address slice 524 was decrypted incorrectly. Some embodiments may generate a fault in that case. Some other embodiments may rely on existing canonicality checks to generate a fault in that case when the decoded linear address 530 is used. Even if the upper bits do all have the same value, that may not conclusively indicate that decrypted address slice 524 was decrypted correctly. Some embodiments may perform the aforementioned checks for expected bit values for both the minimum and maximum addresses to be accessed in the current operation so that a fault will likely be generated if any portion of the access is out-of-bounds. Other embodiments may only require that a particular portion of the access, e.g. the first byte, be within the bounds of the pointer, and thus only perform the aforementioned checks for expected bit values on the pointer for that portion of the access. Other embodiments may check both the minimum and maximum addresses for write operations but only check a single pointer value for reads, relying on data cryptography to likely prevent partially out-of-bounds reads from returning correct plaintext. Given the sparse nature of the linear address space, an incorrectly decrypted address slice 524 will most likely result in a page fault due to a page not being present in the page tables. Finally, the decrypted tag 521 (for example, shown as a three bit tag, but other embodiments may use larger or smaller tag fields) must also correctly match the tag value associated with the memory allocation.

The decoded linear address 530 is used to find the memory location of the encrypted data to be decrypted in Phase III (the encrypted data may be stored in cache). The encrypted data is decrypted by a decryption algorithm such as a counter mode keystream generator 550. In at least one embodiment, keystream generator 550 can be implemented as an AES-CTR mode block cipher, at a particular size granularity (any suitable size). In this embodiment, the contents of the cryptographically encoded pointer are used as the initialization vector (IV) or data tweak 544, with the plaintext offset (e.g., 508) being used as the counter value (CTR). Generation of keystream 551 may commence without waiting for encrypted address slice 504 to complete. Keystream generator 550 encrypts data tweak 544 based on a data key 542 to generate a keystream 551. The value of data tweak 544 may be adjusted to be congruent to 0 (modulo the block size of the keystream generator 550) prior to being used as an input to the keystream generator. The value of the data tweak 544 may have some suitable number of least significant bits set to 0 to satisfy this requirement and a prefix of the keystream 551 may be discarded to account for that adjustment. The number of bytes of the keystream 551 to discard may be computed by subtracting the adjusted value of the data tweak 544 from the unadjusted value of the data tweak 544. This adjustment may modify the values of immutable plaintext 506 in pointers to objects smaller than the block size. However, the data encryption may be indirectly bound to the values of the modified immutable bits, since those bits may be incorporated in the tweak used to generate ciphertext 504. If the memory to be encrypted crosses one or more block-aligned boundaries, the keystream generator 550 may be re-invoked for the subsequent blocks with the data tweak 544 being increased by an amount equal to the block size each time that it is re-invoked. A suffix of the generated keystream 551 may be unneeded and thus discarded. An XOR operation 552 may then be performed on keystream 551 and an encrypted input data block (or cache line) 546 selected from the memory location referenced by the decoded linear address 530. The granularity of the encrypted input data block 546 matches the keystream 551 output from of the keystream generator 550, and the XOR operation 552 produces a decrypted output data block 554. Likewise, when storing data back to cache/memory the same operations may be performed, where the plaintext data from a processor register may be XORed with the keystream output 551 for the encoded address 544 and the resulting encrypted data written back to memory.

When embedded sizes and tags are included in the cryptographic encoding (e.g., as in FIG. 5 or similar embodiments), the tags are per object size and object location in memory. Thus, if the heap manager 104 is consistent about object size (e.g. always replaces the freed object with another object of the same size object but with a different embedded tag, e.g., by incrementing the last tag value), the heap manager 104 does not have to worry about the adjacency of tags, nor keep a history of those tag assignments. If the object is accessed outside of its bounds, the pointer decode logic will catch the error. Tags may then simply be used to prevent use-after-free attacks. Furthermore, if the tag values stored in memory are also encrypted as the data as shown herein, the memory tags themselves become dependent on the object's size and location in memory, allowing the heap manager 104 to freely assign the same tag values for different object sizes, over time (multiple allocations and frees), occupying the same locations in memory. In the encrypted tag scenario, each memory access for data also includes decryption and verification of the corresponding tag value stored in memory.

When tags are encrypted in memory, the heap manager 104 prepares the correct encrypted tag values bound to the cryptographically encoded pointer. This may be done, e.g., using a SetTag processor instruction (or equivalent) that takes the cryptographically encoded address 510 as input for the associated data. The SetTag instruction may thus produce a proper encrypted tag value in memory for the encoded linear address 510, encrypting the memory tag based on the encoded address, determining the tag value and locating the tag entry in memory (for example, when there is a table of tag values stored in linear memory) based on the decoded (e.g., decrypted) linear address 530. For example, if each 4 bit tag stored in memory represents a 16 byte allocation, 4 tags would be set to cover an allocation of 64 bytes in memory by invoking the SetTag instruction four times for the beginning of each 16 byte offset 508, ensuring each tag is encrypted for the corresponding data offset. The tag table would then have an entry for each 16 bytes of linear address and be sized to ⅟₃₂ of addressable linear memory, where each entry includes an encrypted version of the same tag (e.g., 521), but the entries corresponding to the same allocated data block may have different values since each entry was encrypted based on a different cryptographically encoded address 510 (e.g., since the mutable plaintext bits 508 may vary across the addresses 510 used to encrypt the tag entries). Similarly, a GetTag instruction may provide the decrypted memory tag value for an input encoded linear address 510, returning the decrypted tag from memory given the decoded address 530. In various embodiments, the encryption and decryption of the memory tag is performed by using the encoded linear address 510 as a tweak (or as a counter initialization value).

FIG. 11 depicts a flow for associating encrypted tags with corresponding subportions of an allocated data block in accordance with certain embodiments. This FIG. depicts an example illustrating some of the embodiments described in the preceding paragraph. The encoded linear address 510 corresponds to the data block allocation defined by the size bits enumerated number of mutable address bits (four 16 bytes portions in this example, or a 64 byte allocation, are covered by the 6 least significant address bits for 502 size value indicating 6 address bits are mutable and not used for the address tweak as 64=2^6) at the address represented by the encoded linear address 510. In some embodiments, the size field 502 indirectly relates to the data allocation size by specifying how many of the plaintext address bits 506 are to be used to compute the tweak for the encrypted part of the address 504. The remainder (508) corresponds to the address bits that can be manipulated for pointer arithmetic. As long as the array index stays within its bounds, a requester would never increment a bit past the number of address bits indicated by the size field 502. However, if such incrementation does occur, 504 will decrypt incorrectly, likely generating a fault or other error. Each distinct portion of the data block is associated with a 4 bit memory tag value (various embodiments may choose different tag sizes) in memory tag table 1104 (in various embodiments, the memory tag table 1104 may be stored in the same memory as the data 1102 or may be stored in a separate memory). Thus, the allocated data block includes 4 portions that are each associated with a distinct memory tag value. As described above, each memory tag value may be encrypted based on a cryptographically encoded address of the corresponding 16 byte portion of the allocated data block. Thus, although the four memory tag values for the four subportions of the allocated data block represent the same value (i.e., the plaintext tag value), each memory tag value may be encrypted differently (because each is encrypted using a different encoded address offset). When a portion of the data block (e.g., a 16 byte portion) is referenced in a memory access instruction, the memory tag value associated with the portion may be decrypted and compared against the tag provided in the decrypted address 530 by the memory load/store access request (the tag may, at least in some embodiments, also be decrypted during the address decryption operation 520). Thus, the correct decryption of a memory tag value in 1104 is dependent on the size of the associated data allocation, its location in memory, the encrypted address slice 504, and the tag value in the address. If the decrypted tag values match, the memory access instruction is performed. If they do not, an exception or fault (or other error) may be triggered. In the embodiment depicted, the other allocated data blocks have corresponding memory tag values which comprise encrypted versions of the tags assigned to their respective data blocks.

The instructions that access the memory tag table 1104 (e.g., the SetTag, GetTag, or similar instructions) may be privileged or made only invokable by the heap manager 104 (e.g., based on the location of the code in memory) or otherwise restricted to prevent malicious tampering with the tag values stored in memory (for example, by requiring an authorization code, only known to authorized software such as the heap manager 104). To ensure an adversary cannot deduce a keystream stream (e.g., 551) from observing the encrypted memory tags, a different data key 542 may be used when encrypting (e.g. using the SetTag instruction) or decrypting (e.g., using the GetTag instruction) the memory tag values to verify during execution of data store and/or load instructions. Other embodiments may adjust the key stream inputs 544 to indicate if the memory access is for the allocated data or the memory tag.

Embodiments in which the tags are encrypted and stored based on the cryptographic pointers 510 may offer additional protection against adversarial actors. For example, when the tags are not encrypted, the same tag value (e.g., the unencrypted tag value) may be repeated for each entry that corresponds to a portion (e.g., a 16 byte portion) of the allocated data block. Thus, if an adversary is able to guess the tag value, the adversary may access the entire buffer using the same tag value. However, when the memory tags are encrypted, each encrypted tag will have a different encrypted value dependent on its position (thus, each improperly decrypted memory tag will produce a different random value), thus the adversary would have to correctly guess the tag value for each access of a portion of the data block, thus dramatically increasing the odds of catching an invalid or malicious buffer access.

In various embodiments, the tagging constraints described above may be considered on a key-by-key basis. For example, a cryptographic key stored in a register of the processor 102 may be used by the heap manager 104 to encrypt a portion of the pointer returned in response to a memory allocation request and/or by the processor 102 to encrypt data stored in blocks of the heap. Thus, while a particular key is being used, a tag assigned to a particular data block must be different from the tags of the tag history of the block and may not be the same tag used by an adjacent data block. However, if the key being used is changed, the tag histories of the various blocks associated with the key may be reset or otherwise modified such that the tag histories generated while the previous key was being used do not affect selection of tags for data blocks allocated while the new key is being used. In some embodiments, the tag histories may each be associated with a respective key. For example, a first set of tag histories for the data blocks may be generated and used to constrain tag assignment for allocated blocks that are encrypted based on a first key, while a second set of tag histories may be generated and used to constrain tag assignment for the allocated blocks that are encrypted based on a second key.

In a particular embodiment, an application requesting a memory allocation may provide a key that should be used to encrypt data for the resulting block (either by encrypting the data directly using the key or by encrypting a portion of the pointer and potentially using data from the pointer to encrypt the data to be stored in the block). Upon receiving the identification of the key, the heap manager 104 may look up the tag history associated with that key for a block to be allocated and may assign a tag that is not part of that tag history.

The description above refers to keys and tweaks. As used herein, the term "key" may refer to an encryption secret that is passed as an input to a cryptographic mode and may support at least one of the functions of confidentiality and data integrity. For example, a key may refer to a secret bit string that is expanded into a round key schedule string, as performed by typical block ciphers. As used herein, a "tweak" may refer to a value comprising one or more bits used to customize the operation of a block cipher or a cryptographic hash function. For example, a tweak may refer to, among other things, an extra input to a block cipher (e.g., an input other than the usual plaintext or ciphertext input and the cryptographic key). When the same plaintext is encrypted using the same cryptographic key, different tweak values will result in different encrypted data outputs. Similarly, when the same ciphertext is decrypted using the same cryptographic key, different tweak values will result in different plaintext outputs. Any suitable cryptographic mode may be used to perform the encryption and decryption operations described herein. For example, the processor 102 may utilize Advanced Encryption Standard Electronic Codebook (AES-ECB), AES xor-encrypt-xor (XEX) based tweaked-codebook mode with ciphertext stealing (AES-XTS), AES counter (AES-CTR), a k-cipher, SIMON, PRINCE, or SPECK cipher, or other suitable cryptographic modes of operation.

Figure 6:
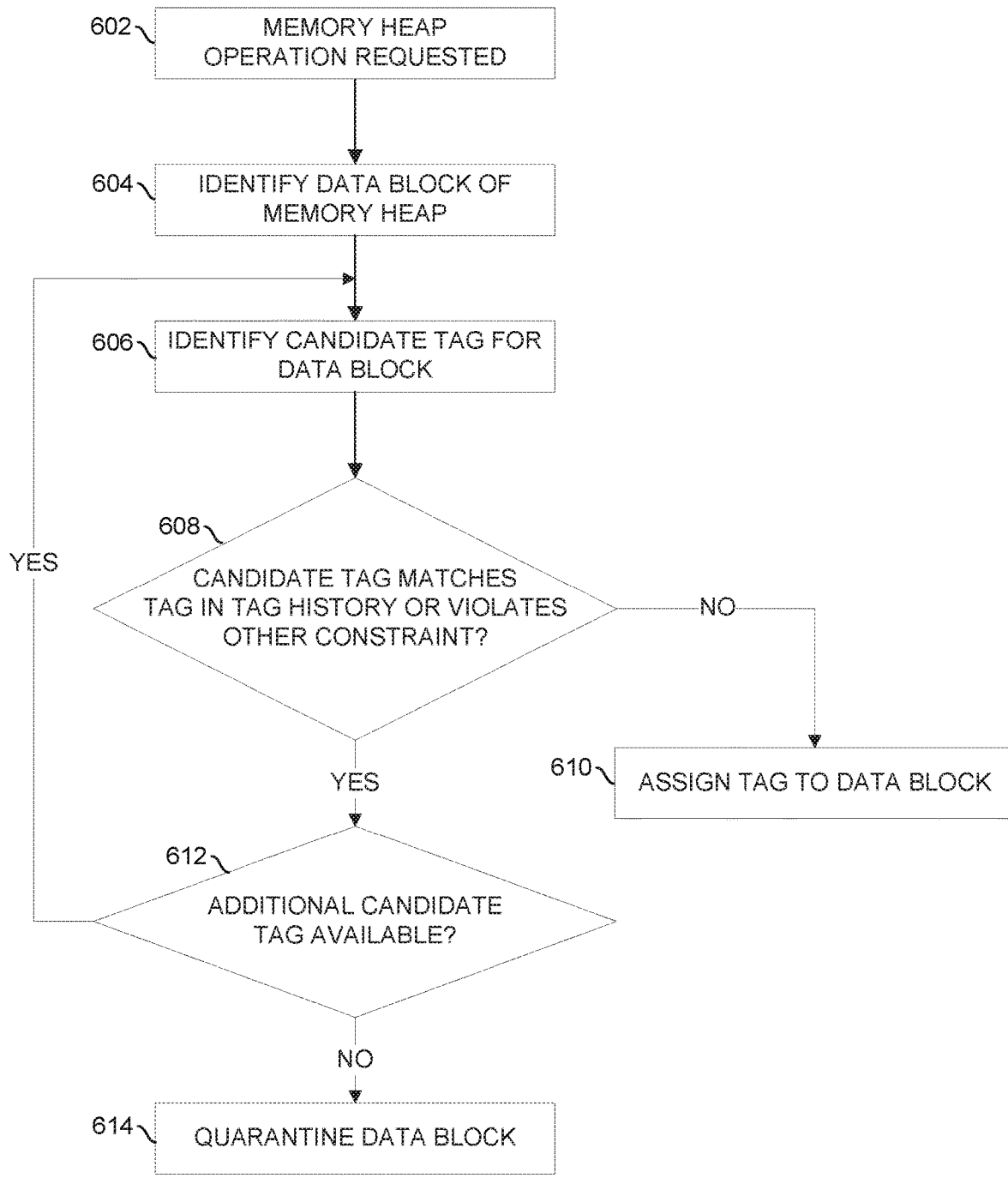
FIG. 6 illustrates a flow for allocating heap memory in accordance with certain embodiments.

FIG. 6 illustrates a flow for allocating heap memory in accordance with certain embodiments. The operation of the flow may be performed by any suitable logic, such as processor 102.

At 602, a memory heap operation is requested. For example, the memory heap operation may include a request to allocate a data block in a heap memory, deallocate a data block in a heap memory, or resize a data block in a heap memory. At 604, a data block of the memory heap is identified. For example, when the request is a request to allocate a data block, the identified data block may be a data block that matches a size included in the request. As another example, when the request is a request to deallocate a data block, the identified data block may be a data block identified by the request.

At 606, a candidate tag for the data block is identified. At 608, a determination is made as to whether the candidate tag matches a tag in the tag history of the data block or whether the candidate tag violates any other constraint (e.g., matches a tag of an adjacent data block). If no constraints are violated, the tag is assigned to data block at 610. If the candidate tag violates a constraint, a determination of whether an additional candidate tag is available is made at 612. If an additional candidate tag is available, the flow returns to 606. If all possible tags have been exhausted and no suitable tags are available for the data block, the data block may be quarantined at 614.

The flows described in FIGS. 3, 4, and 6 are merely representative of operations or communications that may occur in particular embodiments. In other embodiments, additional operations or communications may be performed in the flows. Various embodiments of the present disclosure contemplate any suitable signaling mechanisms for accomplishing the functions described herein. Some of the operations illustrated in FIGS. 3, 4, and 6 may be repeated, combined, modified, or deleted where appropriate. Additionally, operations may be performed in any suitable order without departing from the scope of particular embodiments.

FIGS. 7-10 are block diagrams of exemplary computer architectures that may be used in accordance with any of the embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 7-10.

Figure 7:
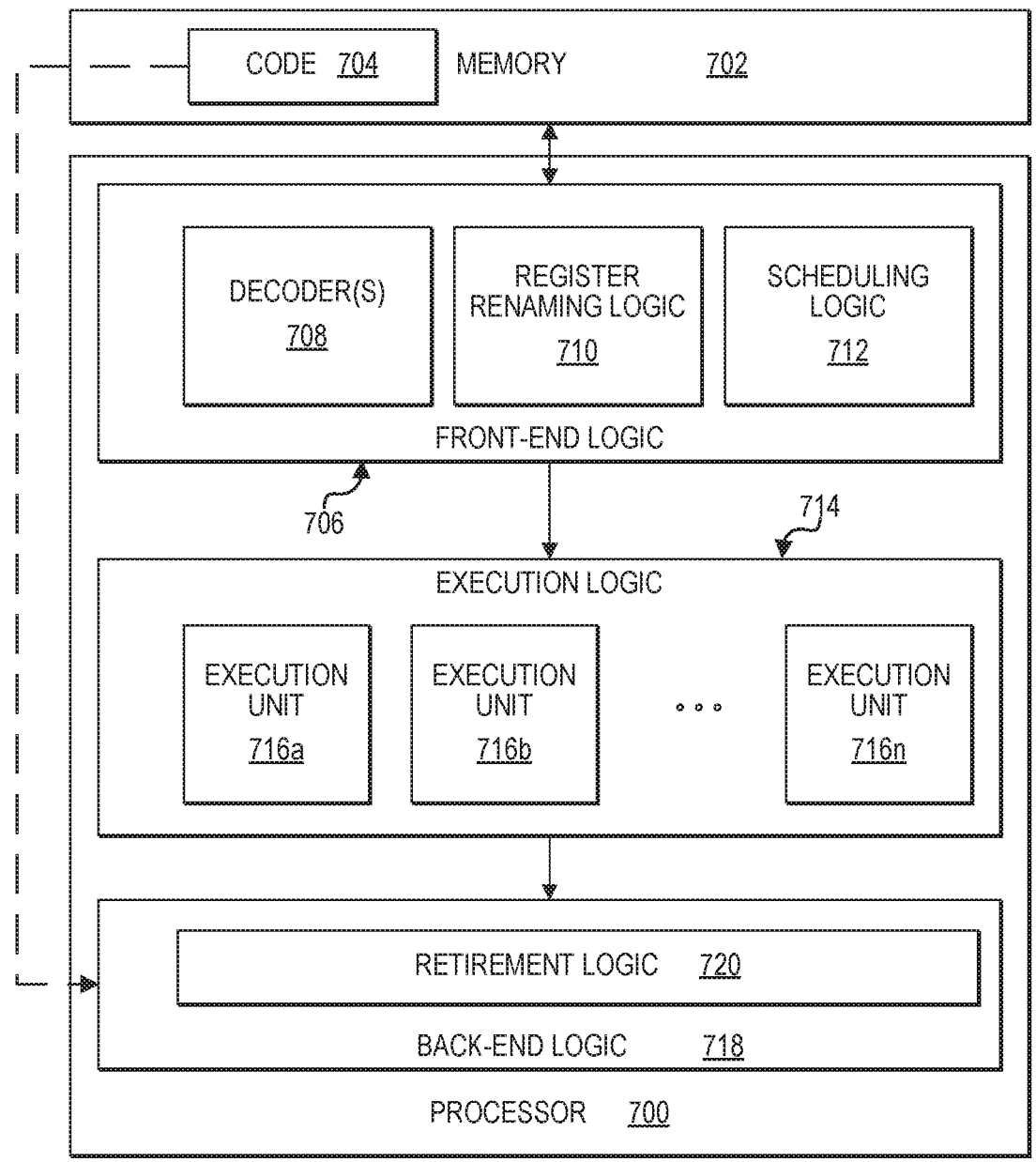
FIG. 7 is a block diagram illustrating an example processor core and memory in accordance with certain embodiments.
Figure 8:
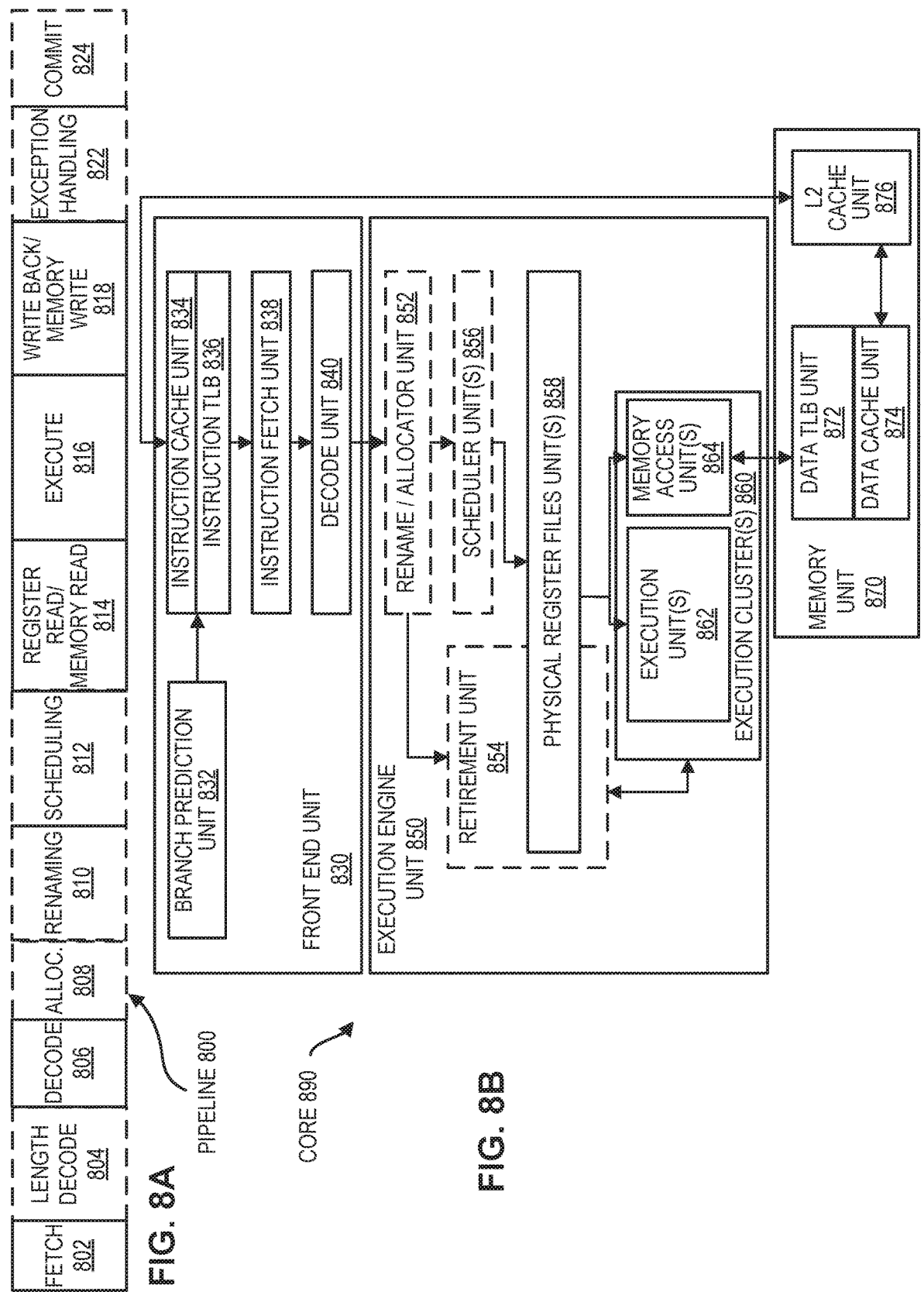
FIG. 8A is a block diagram illustrating both an exemplary in-order pipeline and an exemplary register renaming, out-of-order issue/execution pipeline in accordance with certain embodiments.
FIG. 8B is a block diagram illustrating both an exemplary embodiment of an in-order architecture core and an exemplary register renaming, out-of-order issue/execution architecture core to be included in a processor in accordance with certain embodiments.

FIG. 7 is an example illustration of a processor according to an embodiment. Processor 700 is an example of a type of hardware device that can be used in connection with the implementations shown and described herein (e.g., processor 102). Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 is an example of a type of hardware device that can be used in connection with the implementations shown and described herein (e.g., memory 122). Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716a, 716b, 716n, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8A is a block diagram illustrating both an exemplary in-order pipeline and an exemplary register renaming, out-of-order issue/execution pipeline according to one or more embodiments of this disclosure. FIG. 8B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 8A-8B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a schedule (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. Processor core 890 and memory unit 870 are examples of the types of hardware that can be used in connection with the implementations shown and described herein (e.g., processor 102, memory 122). The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like. In addition, processor core 890 and its components represent example architecture that could be used to implement logical processors and their respective components.

The front end unit 830 includes a branch prediction unit 832 coupled to an instruction cache unit 834, which is coupled to an instruction translation lookaside buffer (TLB) unit 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers (GPRs). In at least some embodiments described herein, register units 858 are examples of the types of hardware that can be used in connection with the implementations shown and described herein (e.g., registers 112). The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 862 may also include an address generation unit (e.g., 822) to calculate addresses used by the core to access main memory (e.g., memory unit 870) and a page miss handler (PMH) (e.g., 826).

The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory. In addition, a page miss handler (e.g., page miss handler 826) may also be included in core 890 to look up an address mapping in a page table if no match is found in the data TLB unit 872.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
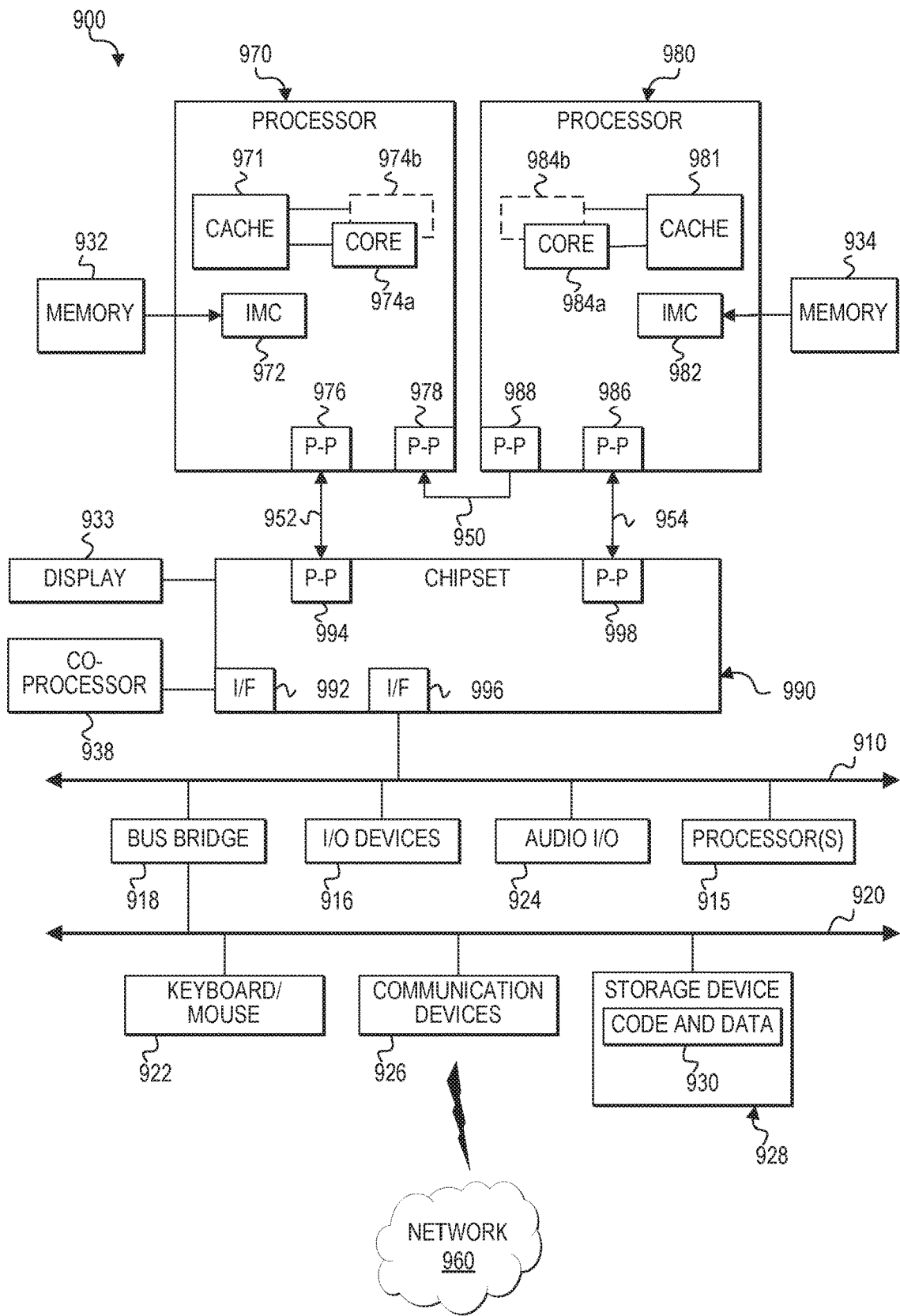
FIG. 9 is a block diagram of an example computer architecture in accordance with certain embodiments.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems or computing devices described (e.g., computing device 100) herein may be configured in the same or similar manner as computing system 900.

Processors 970 and 980 may be implemented as single core processors 974*a* and 984*a* or multi-core processors 974*a*-974*b* and 984*a*-984*b*. Processors 970 and 980 may each include a cache 971 and 981 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 900. Moreover, processors 970 and 980 are examples of the types of hardware that can be used in connection with the implementations shown and described herein (e.g., processor 102).

Processors 970 and 980 may also each include integrated memory controller logic (MC) 972 and 982 to communicate with memory elements 932 and 934, which may be portions of main memory locally attached to the respective processors. In alternative embodiments, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with an input/output (I/O) subsystem 990 via individual point-to-point interfaces 952 and 954 using point-to-point interface circuits 976, 986, 994, and 998. I/O subsystem 990 may also exchange data with a high-performance graphics circuit 938 via a high-performance graphics interface 939, using an interface circuit 992, which could be a PtP interface circuit. In one embodiment, the high-performance graphics circuit 938 is a special-purpose processor, such as, for example, a high-throughput MIC processor, a network or communication processor, compression engine, graphics processor, GPGPU, embedded processor, or the like. I/O subsystem 990 may also communicate with a display 933 for displaying data that is viewable by a human user. In alternative embodiments, any or all of the PtP links illustrated in FIG. 9 could be implemented as a multi-drop bus rather than a PtP link.

I/O subsystem 990 may be in communication with a bus 910 via an interface circuit 996. Bus 910 may have one or more devices that communicate over it, such as a bus bridge 918, I/O devices 916, audio I/O 924, and processors 915. Via a bus 920, bus bridge 918 may be in communication with other devices such as a user interface 922 (such as a keyboard, mouse, touchscreen, or other input devices), communication devices 926 (such as modems, network interface devices, or other types of communication devices that may communicate through a computer network 960), and/or a data storage device 928. Data storage device 928 may store code and data 930, which may be executed by processors 970 and/or 980. In alternative embodiments, any portions of the bus architectures could be implemented with one or more PtP links.

Program code, such as code 930, may be applied to input instructions to perform the functions described herein and generate output information. The output information may be applied to one or more output devices, in known fashion. For purposes of this application, a processing system may be part of computing system 900 and includes any system that has a processor, such as, for example; a digital signal processor (DSP), a microcontroller, an application specific integrated circuit (ASIC), or a microprocessor.

The program code (e.g., 930) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 10:
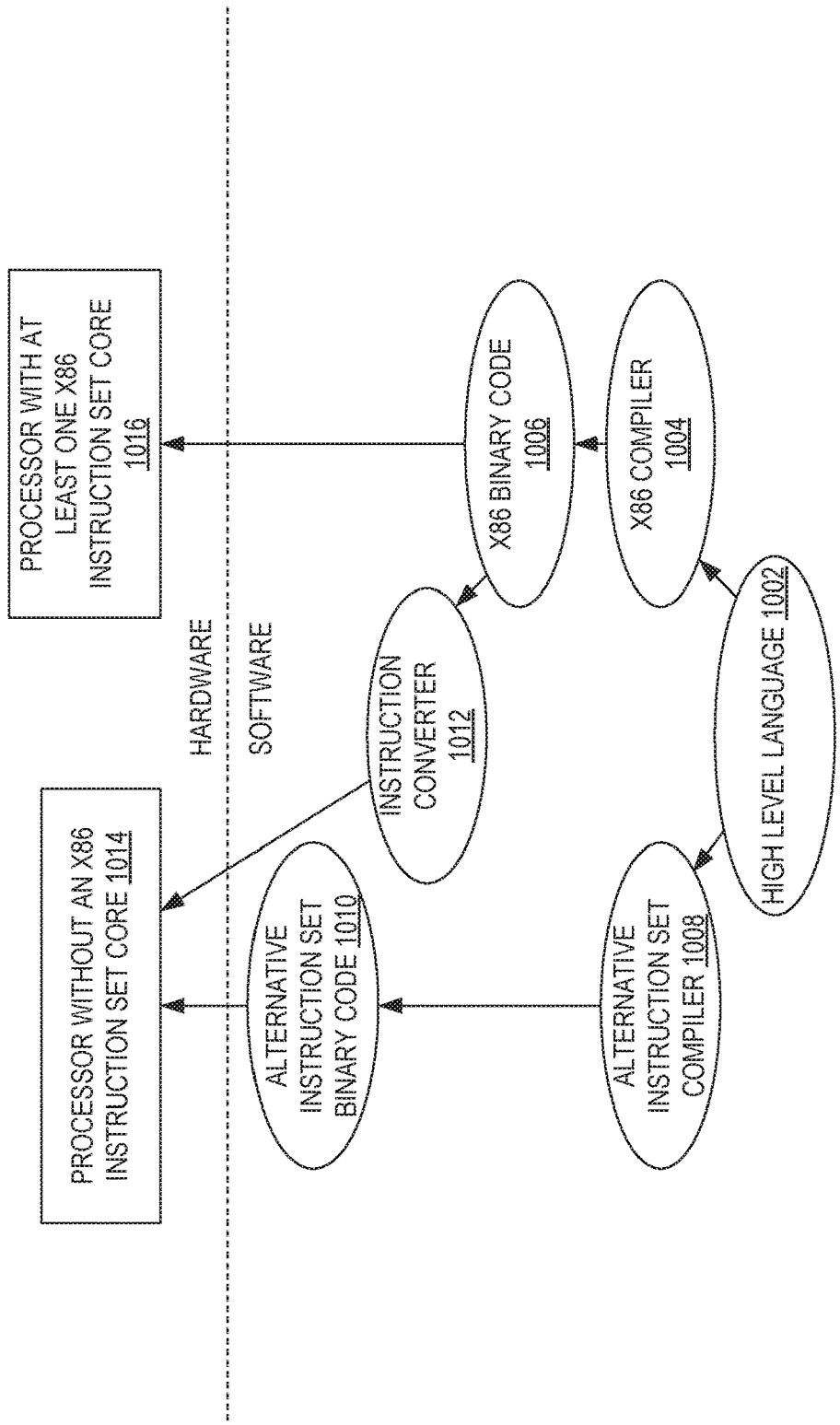
FIG. 10 is a block diagram contrasting the use of a software instruction converter to convert binary instructions in a source instruction set to binary instructions in a target instruction set in accordance with certain embodiments.

FIG. 10 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 10 shows a program in a high level language 1002 may be compiled using an x86 compiler 1004 to generate x86 binary code 1006 that may be natively executed by a processor with at least one x86 instruction set core 1016. The processor with at least one x86 instruction set core 1016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1004 represents a compiler that is operable to generate x86 binary code 1006 (e.g., object code) that can, with or without additional linkage processing, be executed on the processor with at least one x86 instruction set core 1016. Similarly, FIG. 10 shows the program in the high level language 1002 may be compiled using an alternative instruction set compiler 1008 to generate alternative instruction set binary code 1010 that may be natively executed by a processor without at least one x86 instruction set core 1014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1012 is used to convert the x86 binary code 1006 into code that may be natively executed by the processor without an x86 instruction set core 1014. This converted code is not likely to be the same as the alternative instruction set binary code 1010 because an instruction converter capable of this is difficult to make; however, the converted code will accomplish the general operation and be made up of instructions from the alternative instruction set. Thus, the instruction converter 1012 represents software, firmware, hardware, or a combination thereof that, through emulation, simulation or any other process, allows a processor or other electronic device that does not have an x86 instruction set processor or core to execute the x86 binary code 1006.

Logic may be used to implement any of the flows described herein or functionality of the various components such as heap manager 104, runtime tag generator 105, runtime tag checker 106, other components of computing device 100, processor 700, pipeline 800, core 890, system 900, subcomponents of any of these (e.g., heap manager 104), or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example 1 may comprise a processor comprising a decoder to decode a first instruction requesting a memory heap operation; and a heap manager comprising circuitry to responsive to the first instruction requesting the memory heap operation, identify a data block of a memory heap; access a tag history for the data block, the tag history comprising a plurality of tags previously assigned to the data block; assign a tag to the data block, wherein assigning the tag comprises verification that the tag does not match any of the plurality of tags of the tag history; and provide the assigned tag and a reference to a location of the data block.

Example 2 may comprise the subject matter of example 1, wherein assigning the tag to the data block further comprises verification that the tag does not match a tag of a data block adjacent to the data block.

Example 3 may comprise the subject matter of any of examples 1-2, wherein the requested memory heap operation is a memory allocation operation.

Example 4 may comprise the subject matter of any of examples 1-2, wherein the requested memory heap operation is a memory deallocation operation.

Example 5 may comprise the subject matter of any of examples 1-4, wherein the decoder is to decode a second instruction requesting a second memory heap operation; and the heap manager is to responsive to the second instruction requesting the second memory heap operation identify a second data block of the memory heap; access a tag history for the second data block, the tag history comprising a plurality of tags previously assigned to the second data block; and quarantine the second data block responsive to a determination that no tag is available for the second data block, the determination that no tag is available for the second data block based at least in part on the tag history for the second data block.

Example 6 may comprise the subject matter of any of examples 1-5, wherein the heap manager is further to reset the tag history responsive to a switch in a cryptographic key.

Example 7 may comprise the subject matter of any of examples 1-6, wherein the heap manager is to defragment multiple data blocks to form the data block responsive to the first instruction requesting the memory heap operation; and combine tag histories of the multiple data blocks to form the tag history for the data block.

Example 8 may comprise the subject matter of any of examples 1-6, wherein the heap manager is to fragment a second data block into the data block and a third data block responsive to the first instruction requesting the memory heap operation; and duplicate a tag history of the second data block to form the tag history for the data block and a tag history for the third data block.

Example 9 may comprise the subject matter of any of examples 1-8, wherein at least a portion of the tag indicates a size of the data block.

Example 10 may comprise the subject matter of any of examples 1-9, wherein at least a portion of the tag indicates a data type of the data block.

Example 11 may comprise the subject matter of any of examples 1-10, wherein the processor is to receive a request to access the data block, the request indicating the location of the data block and a second tag; and grant access to the data block responsive to a determination that the second tag matches the tag assigned to the data block.

Example 12 may comprise the subject matter of any of examples 1-11, further comprising one or more of: a battery communicatively coupled to the processor, a display communicatively coupled to the processor, or a network interface communicatively coupled to the processor.

Example 13 may comprise a method comprising responsive to a first instruction requesting a memory heap operation, identifying a data block of a memory heap; accessing a tag history for the data block, the tag history comprising a plurality of tags previously assigned to the data block; assigning a tag to the data block, wherein assigning the tag comprises verification that the tag does not match any of the plurality of tags of the tag history; and providing the assigned tag and a reference to a location of the data block.

Example 14 may comprise the subject matter of example 13, wherein assigning the tag to the data block further comprises verification that the tag does not match a tag of a data block adjacent to the data block.

Example 15 may comprise the subject matter of any of examples 13-14, wherein the requested memory heap operation is a memory allocation operation.

Example 16 may comprise the subject matter of any of examples 13-14, wherein the requested memory heap operation is a memory deallocation operation.

Example 17 may comprise the subject matter of any of examples 13-16, wherein the method further comprises responsive to the second instruction requesting a second memory heap operation, identifying a second data block of the memory heap; accessing a tag history for the second data block, the tag history comprising a plurality of tags previously assigned to the second data block; and quarantining the second data block responsive to a determination that no tag is available for the second data block, the determination that no tag is available for the second data block based at least in part on the tag history for the second data block.

Example 18 may comprise the subject matter of any of examples 13-17, the method further comprising resetting the tag history responsive to a switch in a cryptographic key.

Example 19 may comprise the subject matter of any of examples 13-18, further comprising defragmenting multiple data blocks to form the data block responsive to the first instruction requesting the memory heap operation; and combining tag histories of the multiple data blocks to form the tag history for the data block.

Example 20 may comprise the subject matter of any of examples 13-18, further comprising fragmenting a second data block into the data block and a third data block responsive to the first instruction requesting the memory heap operation; and duplicating a tag history of the second data block to form the tag history for the data block and a tag history for the third data block.

Example 21 may comprise the subject matter of any of examples 13-20, wherein at least a portion of the tag indicates a size of the data block.

Example 22 may comprise the subject matter of any of examples 13-21, wherein at least a portion of the tag indicates a data type of the data block.

Example 23 may comprise the subject matter of any of examples 13-22, wherein the processor is to receive a request to access the data block, the request indicating the location of the data block and a second tag; and grant access to the data block responsive to a determination that the second tag matches the tag assigned to the data block.

Example 24 may comprise one or more non-transitory computer-readable media with code stored thereon, wherein the code is executable to cause a machine to, responsive to a first instruction requesting a memory heap operation identify a data block of a memory heap; access a tag history for the data block, the tag history comprising a plurality of tags previously assigned to the data block; assign a tag to the data block, wherein assigning the tag comprises verification that the tag does not match any of the plurality of tags of the tag history; and provide the assigned tag and a reference to a location of the data block.

Example 25 may comprise the subject matter of example 24, wherein assigning the tag to the data block further comprises verification that the tag does not match a tag of a data block adjacent to the data block.

Example 26 may comprise the subject matter of any of examples 24-25, wherein the requested memory heap operation is a memory allocation operation.

Example 27 may comprise the subject matter of any of examples 24-25, wherein the requested memory heap operation is a memory deallocation operation.

Example 28 may comprise the subject matter of any of examples 24-27, wherein the code is executable to cause a machine to, responsive to a second instruction requesting a second memory heap operation, identify a second data block of the memory heap; access a tag history for the second data block, the tag history comprising a plurality of tags previously assigned to the second data block; and quarantine the second data block responsive to a determination that no tag is available for the second data block, the determination that no tag is available for the second data block based at least in part on the tag history for the second data block.

Example 29 may comprise the subject matter of any of examples 24-28, wherein the code is executable to cause the machine to reset the tag history responsive to a switch in a cryptographic key.

Example 30 may comprise the subject matter of any of examples 24-29, wherein the code is executable to cause the machine to defragment multiple data blocks to form the data block responsive to the first instruction requesting the memory heap operation; and combine tag histories of the multiple data blocks to form the tag history for the data block.

Example 31 may comprise the subject matter of any of examples 24-29, wherein the code is executable to cause the machine to fragment a second data block into the data block and a third data block responsive to the first instruction requesting the memory heap operation; and duplicate a tag history of the second data block to form the tag history for the data block and a tag history for the third data block.

Example 32 may comprise the subject matter of any of examples 24-31, wherein at least a portion of the tag indicates a size of the data block.

Example 33 may comprise the subject matter of any of examples 24-32, wherein at least a portion of the tag indicates a data type of the data block.

Example 34 may comprise the subject matter of any of examples 24-33, wherein the code is executable to cause the machine to receive a request to access the data block, the request indicating the location of the data block and a second tag; and grant access to the data block responsive to a determination that the second tag matches the tag assigned to the data block.

Example 35 may comprise the subject matter of any of examples 1-12, wherein the heap manager is to request association of a first encrypted tag with a first subportion of the data block and request association of a second encrypted tag with a second subportion of the data block, wherein the first encrypted tag comprises the assigned tag encrypted based on an address of the first subportion, and wherein the second encrypted tag comprises the assigned tag encrypted based on an address of the second subportion.

Example 36 may comprise the subject matter of example 35, wherein the address of the first subportion and the address of the second subportion each comprise cryptographically encoded address bits.

Example 37 may comprise the subject matter of any of examples 13-23, further comprising requesting association of a first encrypted tag with a first subportion of the data block and requesting association of a second encrypted tag with a second subportion of the data block, wherein the first encrypted tag comprises the assigned tag encrypted based on an address of the first subportion, and wherein the second encrypted tag comprises the assigned tag encrypted based on an address of the second subportion.

Example 38 may comprise the subject matter of example 37, wherein the address of the first subportion and the address of the second subportion each comprise cryptographically encoded address bits.

Example 39 may comprise the subject matter of any of examples 24-34, wherein the code is executable to cause the machine to request association of a first encrypted tag with a first subportion of the data block and request association of a second encrypted tag with a second subportion of the data block, wherein the first encrypted tag comprises the assigned tag encrypted based on an address of the first subportion, and wherein the second encrypted tag comprises the assigned tag encrypted based on an address of the second subportion.

Example 40 may comprise the subject matter of example 39, wherein the address of the first subportion and the address of the second subportion each comprise cryptographically encoded address bits.

What is claimed is:

1. A processor comprising:
   a decoder to decode a first instruction requesting a memory heap operation; and
   circuitry to implement a heap manager, the heap manager to:
   responsive to the first instruction requesting the memory heap operation:
   defragment multiple data blocks to form a data block of a memory heap;
   combine tag histories of the multiple data blocks to form a tag history for the data block, wherein the tag histories comprise a first tag history comprising at least one tag previously assigned to a first data block of the multiple data blocks and a second tag history comprising at least one tag previously assigned to a second data block of the multiple data blocks;
   assign a tag to the data block, wherein assigning the tag comprises verification that the tag does not match any tags of the tag history for the data block; and
   provide the assigned tag and a reference to a location of the data block.

2. The processor of claim 1, wherein assigning the tag to the data block further comprises verification that the tag does not match a tag of a data block adjacent to the data block.

3. The processor of claim 1, wherein the requested memory heap operation is a memory allocation operation.

4. The processor of claim 1, wherein the requested memory heap operation is a memory deallocation operation.

5. The processor of claim 1, wherein:
the decoder is to decode a second instruction requesting a second memory heap operation; and
the heap manager is to:
responsive to the second instruction requesting the second memory heap operation:
identify a second data block of the memory heap;
access a tag history for the second data block, the tag history comprising a plurality of tags previously assigned to the second data block; and
quarantine the second data block responsive to a determination that no tag is available for the second data block, the determination that no tag is available for the second data block based at least in part on the tag history for the second data block.

6. The processor of claim 1, wherein the heap manager is further to reset the tag history responsive to a switch in a cryptographic key.

7. The processor of claim 1, wherein the heap manager is to:
defragment multiple data blocks to form the data block responsive to the first instruction requesting the memory heap operation; and
combine tag histories of the multiple data blocks to form the tag history for the data block.

8. The processor of claim 1, wherein the heap manager is to:
fragment a second data block into the data block and a third data block responsive to the first instruction requesting the memory heap operation; and
duplicate a tag history of the second data block to form the tag history for the data block and a tag history for the third data block.

9. The processor of claim 1, wherein at least a portion of the tag indicates a size of the data block.

10. The processor of claim 1, wherein at least a portion of the tag indicates a data type of the data block.

11. The processor of claim 1, wherein the processor is to:
receive a request to access the data block, the request indicating the location of the data block and a second tag; and
grant access to the data block responsive to a determination that the second tag matches the tag assigned to the data block.

12. The processor of claim 1, further comprising one or more of: a battery communicatively coupled to the processor, a display communicatively coupled to the processor, or a network interface communicatively coupled to the processor.

13. The processor of claim 1, wherein the heap manager is to request association of a first encrypted tag with a first subportion of the data block and request association of a second encrypted tag with a second subportion of the data block, wherein the first encrypted tag comprises the assigned tag encrypted based on an address of the first subportion, and wherein the second encrypted tag comprises the assigned tag encrypted based on an address of the second subportion.

14. The processor of claim 13, wherein the address of the first subportion and the address of the second subportion each comprise cryptographically encoded address bits.

15. A method comprising:
responsive to a first instruction requesting a memory heap operation:
defragmenting multiple data blocks to form a data block of a memory heap;
combining tag histories of the multiple data blocks to form a tag history for the data block, wherein the tag histories comprise a first tag history comprising at least one tag previously assigned to a first data block of the multiple data blocks and a second tag history comprising at least one tag previously assigned to a second data block of the multiple data blocks:
assigning a tag to the data block, wherein assigning the tag comprises verification that the tag does not match any of the tags of the tag history for the data block; and
providing the assigned tag and a reference to a location of the data block.

16. The method of claim 15, further comprising:
defragmenting multiple data blocks to form the data block responsive to the first instruction requesting the memory heap operation; and
combining tag histories of the multiple data blocks to form the tag history for the data block.

17. The method of claim 15, further comprising:
fragmenting a second data block into the data block and a third data block responsive to the first instruction requesting the memory heap operation; and
duplicating a tag history of the second data block to form the tag history for the data block and a tag history for the third data block.

18. One or more non-transitory computer-readable media with code stored thereon, wherein the code is executable to cause a machine to:
responsive to a first instruction requesting a memory heap operation:
defragment multiple data blocks to form a data block of a memory heap;
combine tag histories of the multiple data blocks to form a tag history for the data block, wherein the tag histories comprise a first tag history comprising at least one tag previously assigned to a first data block of the multiple data blocks and a second tag history comprising at least one tag previously assigned to a second data block of the multiple data blocks;
assign a tag to the data block, wherein assigning the tag comprises verification that the tag does not match any of a plurality of tags of the tag history for the data block; and
provide the assigned tag and a reference to a location of the data block.

19. The one or more computer-readable media of claim 18, wherein the code is executable to cause the machine to:
defragment multiple data blocks to form the data block responsive to the first instruction requesting the memory heap operation; and
combine tag histories of the multiple data blocks to form the tag history for the data block.

20. The one or more computer-readable media of claim 18, wherein the code is executable to cause the machine to:
fragment a second data block into the data block and a third data block responsive to the first instruction requesting the memory heap operation; and duplicate a tag history of the second data block to form the tag history for the data block and a tag history for the third data block.

* * * * *